(12) United States Patent
Whelan et al.

(10) Patent No.: US 8,125,633 B2
(45) Date of Patent: Feb. 28, 2012

(54) CALIBRATION OF A RADIOMETRIC OPTICAL MONITORING SYSTEM USED FOR FAULT DETECTION AND PROCESS MONITORING

(75) Inventors: Mike Whelan, Coppell, TX (US); Andrew Weeks Kueny, Dallas, TX (US); Kenneth C. Harvey, Dallas, TX (US); John Douglas Corless, Dallas, TX (US)

(73) Assignee: Verity Instruments, Inc., Carrollton, TX (US)

( * ) Notice: Subject to any disclaimer, the term of this patent is extended or adjusted under 35 U.S.C. 154(b) by 606 days.

(21) Appl. No.: 12/151,449

(22) Filed: May 6, 2008

(65) Prior Publication Data

US 2009/0103081 A1 Apr. 23, 2009

Related U.S. Application Data

(60) Provisional application No. 60/928,377, filed on May 7, 2007, provisional application No. 61/045,585, filed on Apr. 16, 2008.

(51) Int. Cl.
*G01J 3/00* (2006.01)
(52) U.S. Cl. ...................................... 356/300
(58) Field of Classification Search .......... 356/300, 356/72–73; 250/252.1; 702/104
See application file for complete search history.

(56) References Cited

U.S. PATENT DOCUMENTS

| | | | |
|---|---|---|---|
| 4,614,109 A | | 9/1986 | Hofmann |
| 4,866,644 A | * | 9/1989 | Shenk et al. ............ 356/319 |
| 5,243,546 A | * | 9/1993 | Maggard ................. 702/90 |
| 5,459,677 A | * | 10/1995 | Kowalski et al. ......... 703/2 |
| 5,708,593 A | * | 1/1998 | Saby et al. .............. 702/85 |

(Continued)

OTHER PUBLICATIONS

Johnson, Radiometric Metrology for Remote Sensing, Intl. Workshop on Radiometric & Geometric Calibration, National Institute of Standards and Technology, Dec. 2003.
GS-5120A/GS-5150 Deuterium Light Source, Product Specification Sheet, Gamma Scientific, San Diego, CA.

(Continued)

*Primary Examiner* — Kara E Geisel
(74) *Attorney, Agent, or Firm* — Rudolph J. Buchel, Jr.

(57) ABSTRACT

The present invention is directed to a system and method for radiometric calibration of spectroscopy equipment utilized in fault detection and process monitoring. Initially, a reference spectrograph is calibrated to a local primary standard (a calibrated light source with known spectral intensities and traceable to a reference standard). Other spectrographs are then calibrated from the reference spectrograph rather than the local primary calibration standard. This is accomplished by viewing a light source with both the reference spectrograph and the spectrograph to be calibrated. The output from the spectrograph to be calibrated is compared to the output of the reference spectrograph and then adjusted to match that output. The present calibration process can be performed in two stages, the first with the spectrographs calibrated to the reference spectrograph and then are fine tuned to a narrow band light source at the plasma chamber. Alternatively, the reference spectrograph can be calibrated to the local primary standard while optically coupled to the plasma chamber. There, the local primary standard calibration light source is temporarily positioned within the plasma chamber, or in a light chamber disposed along the interior of the chamber for calibrating the reference spectrograph. Other spectrographs can be calibrated to the reference spectrograph while coupled to the plasma chamber with the local primary standard calibration light source, thereby calibrating every component in the entire optical path to the reference spectrograph.

48 Claims, 14 Drawing Sheets

U.S. PATENT DOCUMENTS

| | | | |
|---|---|---|---|
| 5,835,230 A | | 11/1998 | McAndrew et al. |
| 6,043,894 A | * | 3/2000 | Van Aken et al. ............. 356/402 |
| 6,077,386 A | | 6/2000 | Smith, Jr. et al. |
| 6,128,544 A | * | 10/2000 | Ricoux et al. ................. 700/110 |
| 6,134,005 A | | 10/2000 | Smith, Jr. et al. |
| 6,246,473 B1 | | 6/2001 | Smith, Jr. et al. |
| 6,621,574 B1 | | 9/2003 | Forney et al. |
| 7,048,837 B2 | | 5/2006 | Somekh et al. |
| 7,075,643 B2 | | 7/2006 | Holub |
| 7,169,625 B2 | | 1/2007 | Davis et al. |
| 2004/0214581 A1 | | 10/2004 | Davis et al. |
| 2006/0170329 A1 | | 8/2006 | Tojo et al. |

OTHER PUBLICATIONS

Ohno, NIST Measurement Services, NIST Special Publication 250-37, National Institute of Standards and Technology, Jul. 1997.

Ohno, Characterization of Modified FEL Quartz-Halogen Lamps for Photometric Standards, Final manuscript, Metrologia 1995/96, 32, 693-696.

Kerber, New Insights from the ST-ECF Lamp Project, ST-ECF Newsletter 37, Dec. 2004.

Larason, Spectroradiometric Detector Measurements, NIST Special Publication 250-41, Feb. 1998.

* cited by examiner

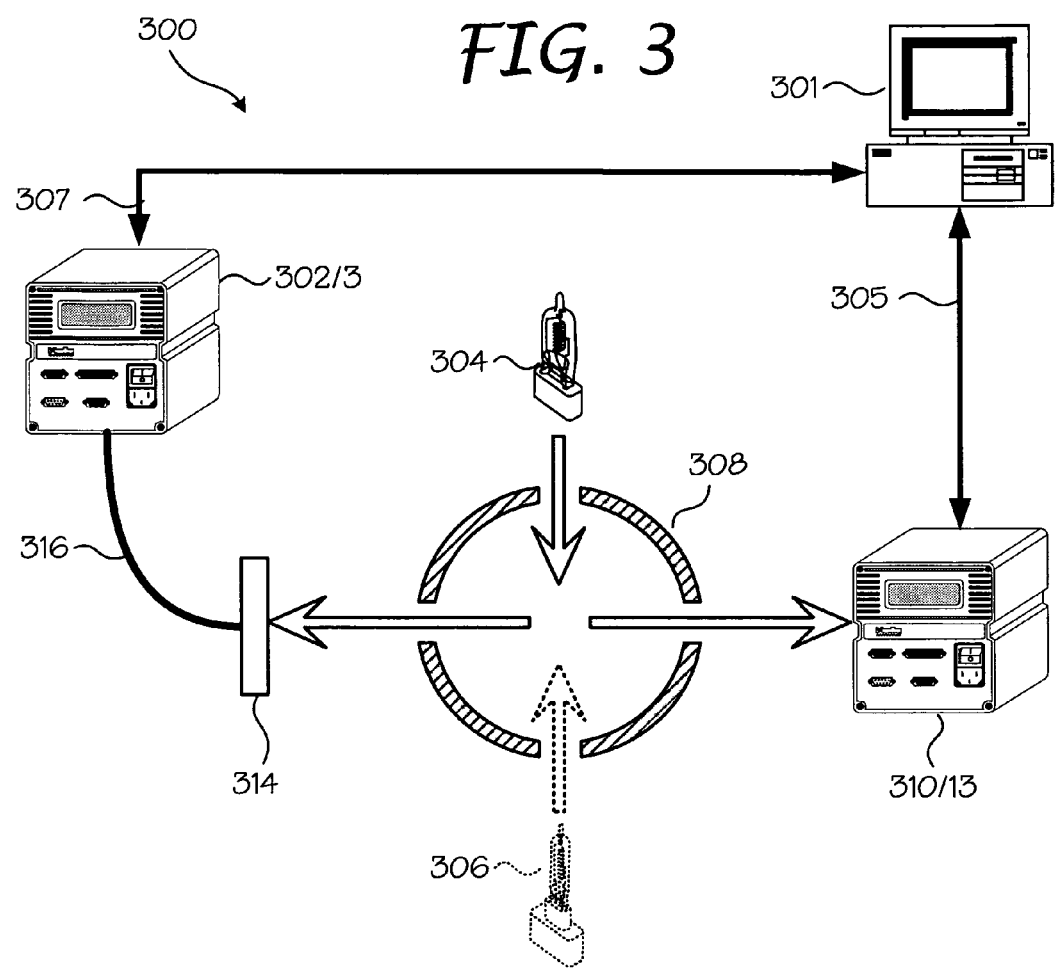

Drift

CALIBRATION OF A RADIOMETRIC OPTICAL MONITORING SYSTEM USED FOR FAULT DETECTION AND PROCESS MONITORING

CROSS-REFERENCE TO RELATED APPLICATION

This application is related to and claims the benefit of co-pending U.S. Provisional Application Ser. No. 60/928,377, filed on May 7, 2007 and entitled "Calibration of a Radiometric Optical Monitoring System Used for Fault Detection and Process Monitoring," and co-pending U.S. Provisional Application Ser. No. 61/045,585, filed on Apr. 16, 2008 and entitled "Calibration of a Radiometric Optical Monitoring System Used for Fault Detection and Process Monitoring," which are assigned to the assignee of the present invention. The above identified applications are incorporated by reference herein in their entireties.

BACKGROUND OF THE INVENTION

The present invention relates generally to obtaining accurate optical emission spectroscopy measurements. More particularly, the present invention relates to a system and method for radiometric calibration of spectroscopy equipment utilized in fault detection and process monitoring.

In the art of semiconductor processing, in order to form integrated circuit structures from wafers, selectively removing or depositing materials on a semiconductor wafer is well known. Removal of material from a semiconductor wafer is accomplished by employing some type of etching process, for instance and including, reactive ion etching, deep-ion etching, sputtering etching, and plasma etching. Depositing material on a wafer may involve chemical and physical vapor depositions, evaporative deposition, electron beam physical vapor deposition, sputtering deposition, pulsed laser deposition, molecular beam epitaxy and high velocity oxygen deposition. Other removal and deposition processes are known. Such processes are tightly controlled and are performed in a sealed process chamber. Because exact amounts of material are deposited onto or removed from the substrate wafer, its progress must be continually and accurately monitored to precisely determine the stopping time or endpoint of a particular process. Optically monitoring the chamber process is one very useful tool for determining the stage or endpoint for an ongoing process. For instance, the interior of the chamber may be optically monitored for certain known emission lines by spectrally analyzing predetermined wavelengths of light emitted or reflected from the target in the chamber. Conventional methods include optical emission spectroscopy (OES), absorption spectroscopy, reflectometry, etc. Typically, an optical sensor or source is positioned on the exterior of the chamber and adjacent to a viewport or window, with a vantage point to the target area in the chamber to be observed.

One problem with optical monitoring chamber processes is that it is difficult or impossible to accurately measure absolute values during many of these processes. This is primarily due to the accumulation of contaminants in the optical path, e.g., the clouding of the viewport windows from which optical measurements are made. Therefore, calibration processes known in the prior art have, to a large extent, evolved primarily in view of these unresolved problems. While it is possible to calibrate a spectrograph and its associated spectrographic detector across its entire spectral range using a broad band calibration standard, that level of accuracy is sometimes considered excessive since the viewport window will begin to cloud almost immediately, thereby reducing the accuracy of subsequent optical measurements. As the optical viewport window becomes clouded, it is sometimes presumed that its transmission is affected approximately uniformly across the entire spectral range of the spectrograph. Thus, many of the window clouding shortcomings can be compensated for somewhat by not relying on absolute values in the process and diagnostic algorithms. Thus, many measurement processes utilize comparisons of relative values rather than comparisons of absolute values. The prior art emphasizes the accuracy of the measurement of the particular spectra that are associated with a process gas and the accuracy of the measurement of the effect of contaminants on the viewport window.

U.S. Pat. No. 5,835,230 to McAndrew, et al. entitled "Method for Calibration of a Spectroscopic Sensor" discloses a system that utilizes a measurement cell with at least one light port (or a light entry port and a light exit port) with a light transmissive window through which a light beam passes along an internal light path inside the measurement cell. The calibration system also has an optical chamber which contains a light source for generating the light beam which passes through the light entry port into the cell as well as a detector for measuring the light beam exiting the cell through the light exit port. A gas inlet is connected to the optical chamber in which a calibration gas stream, that contains gas species and a carrier gas in known concentration, is introduced into the optical chamber. A spectroscopy measurement of the calibration gas stream is then performed. Using the calibration system, spectral calibrations can be realized for the spectrograph relative to a specific gas species and carrier gases in various concentrations.

U.S. Pat. No. 6,246,473 to Smith, et al. entitled "Method and Apparatus for Monitoring Plasma Processing Operations," discloses an apparatus and calibration scheme for in situ measurements of the inner and outer surfaces of the viewport window in a plasma chamber. The apparatus includes a window monitoring or calibration module to determine the effect, if any, that the inner surface of the window is having on the light being emitted from the processing chamber during plasma processes. The calibration is intended to address wavelength shifts, intensity shifts, or both, that are associated with optical emissions data obtained on a plasma process. Essentially, the calibration device has dual optical paths, one path for optically monitoring light emitted from inside the process chamber, through the window, and another path for obtaining light reflected from calibration light sources for evaluating the state of the inner surface of the window. The calibration light source (or light sources) is located externally and projects a calibrated light that is reflected off of the surfaces of the window for making transmission comparisons for the window. Both U.S. Pat. Nos. 5,835,230 and 6,246,473 are incorporated by reference herein in their entireties.

Among other deficiencies, neither of these references addresses problems associated with calibrating the system along the entire optical path, from inside the chamber to the spectrographic sensor. Furthermore, the prior art calibration techniques rely heavily on the use of a local primary standard calibration light source.

BRIEF SUMMARY OF THE INVENTION

The present invention is directed to a system and method for calibrating radiometric spectroscopy equipment utilized in fault detection and process monitoring. Initially, a reference spectrograph is selected based on various criteria, such as rigidity, stability, and operational design factors. In an initial calibration stage, the response of the reference spectrograph is calibrated to a local primary standard (a stable calibrated light source traceable to a recognized standard, or alternatively, an uncalibrated stable light source that is used in conjunction with a calibrated photodetector that is traceable to a recognized standard). The subject reference spectrograph comprises at least a dispersing element for dispersing light into a spectrum, an optical detector for converting spectral light from the spectrograph to raw (uncalibrated) spectral intensity data, and processing capacity (software and/or firmware for converting the raw spectral intensity data into calibrated data). Any air passages in the optical path of the spectrograph should be purged of oxygen or the air circulated to avoid the accumulation of ozone in the optical path. The local primary standard calibration light source, typically comprising a lamp and power supply, may be of any type but should be designed for calibrating spectrographic equipment and have intensities and accuracy traceable to a recognized standard (such as a standard specification promulgated by the National Institute of Standards and Technology (NIST). Furthermore, the standard calibration light source may actually be two or more separate standard calibration light sources designed for specific purposes. For instance, one or more standard sources for performing intensity calibrations and one or more standard sources for making wavelength calibrations. Optimally, the bandwidth of the standard calibration light source should encompass the spectral range of the reference spectrograph.

The initial stage of the calibration phase is typically performed at the site of the manufacturer of the spectrograph, but may instead be performed at the location of the end user and proceeds as follows. Raw spectroscopy data is generated by the reference spectrograph in response to receiving light from the local primary standard calibration light source. By comparing the raw spectroscopy data to the known spectral data for the local primary standard calibration light source, a set of reference output correction coefficients can be derived for the reference spectrograph. These reference output correction coefficients are used in conjunction with an output algorithm to convert the raw spectral data to calibrated spectral data that matches the known intensities of local primary standard calibration light source. Once calibrated, the reference spectrograph will produce quantitative spectroscopy measurements for any light source within its spectral range. The reference spectrograph therefore serves as a secondary standard.

Next, the response of reference spectrograph is used as a secondary standard for calibrating one or more production spectrographs to a separate light source. The reference spectrograph and a production spectrograph receive spectral radiation from a production reference light source and generate separate outputs in response to the light. Optimally, the spectral bandwidth of the production reference light source should be similar to the spectral range of a production spectrograph. This light source need not be a calibration light source, and the precise spectral intensities of the light need not be known because that information will be accurately measured by the reference spectrograph. It is expected that the reference and production spectrographs receive light from the production reference light source simultaneously, thereby removing the requirement for a stable light source of known intensity. Alternatively, if the production reference light source is relatively stable, the output from the reference and production spectrographs may be acquired sequentially. The uncalibrated output from the production spectrograph is compared to the calibrated output produced by the reference spectrograph. Based on that comparison, a set of production output correction coefficients can be derived for the production spectrograph to be used in conjunction with an output algorithm for adjusting the raw output to the known intensities of the production reference light source. Once calibrated, a production spectrograph will produce quantitative spectroscopy measurements for any light source within its spectral range (similarly to the reference spectrograph). Note that the calibration of the production spectrograph is accomplished without using a standard calibration light source. Additional production spectrographs may be calibrated in a similar manner. In so doing, the present invention enables comparisons of spectra generated on different spectrographs and, even more importantly, facilitates quantitative comparisons of results obtained from different process chambers using different, but calibrated, spectrographs.

At predetermined intervals, or after a predetermined amount of usage, the integrity of the reference spectrograph should be checked against the local primary standard and recalibrated if necessary. The amount of variation between calibrations may also be checked. If the drift amount is above a predetermined level, the stability of the reference spectrograph and/or standard calibration light source may be of concern and routine maintenance should be performed on the calibration system.

In accordance with other embodiments of the present invention, the production spectrograph and optical coupling system can be calibrated together as a single unit. In so doing, the response of the spectrograph can be calibrated for any changes in the throughput that may result from the addition of the optical coupling system. Here again, all air passages in the optical path should be purged of oxygen or the air circulated to avoid the accumulation of ozone in the optical path. If an optical fiber is used with the coupling system, the fiber should be arranged identically for calibration as it will be configured with the production chamber. If the production configuration is not known during the initial calibration stage, then the arrangement of optical fiber used for the calibration can be recorded and sent to the fabrication facility with the calibration data. In that way, the production operator can configure the arrangement of the optical fiber with the production chamber identical to the arrangement during the initial calibration stage.

Slight variations in the throughput may still occur due to shipping or reconfiguring of the optical fiber for the process chamber. Therefore, in accordance with still another exemplary embodiment of the present invention, the production spectrograph and optical coupling system that was initially calibrated together as a single unit may be fine tuned to account for shipping or reconfiguration changes. Furthermore, this fine tuning calibration stage will also account for changes in the throughput resulting from the unit being coupled to the process chamber. It is expected that this stage of the calibration phase is performed at the fabrication facility, usually by the operator of the plasma chamber. Here, it might be assumed that any changes in the calibration from the initial calibration stage would be constant across the entire spectral range of the spectrograph. Therefore, a single wavelength light source (or narrow band light source) should suffice. Optimally, if a single wavelength is utilized, the light source should be selected such that the wavelength is in a portion of the spectral range that is useful in a process measurement to be performed. The fine tuning calibration stage begins by positioning the single wavelength light source so that light must pass through the window to be detected by the spectrograph. The light source should be situated in the identical position on each process chamber so that the calibration results can be duplicated at will on different chambers. One mechanism for assuring reproducible alignments is by using an alignment/positioning jig with the light source for placement. Another mechanism for assuring repeatable results is to create, in a predetermined location, a light chamber for permanently housing the light source that is located on the opposing wall of the process chamber to the viewport window. The light chamber should have a light chamber window to protect the light source and further include a shutter that can be closed during processing to protect the light chamber window from harmful effects of the plasma and other contaminants present in the process chamber.

Alternatively, and in accordance with still another exemplary embodiment of the present invention, the calibration of a spectrograph discussed above may be accomplished entirely at the fabrication facility. Accordingly, a production spectrograph is coupled to a process chamber via the optical coupling system. Here, the intent is not only to calibrate the spectrograph for production, but also to calibrate the spectrograph for any changes in the throughput caused by any part of the optical system associated with the spectrograph, including the portion from within the process chamber. The calibration proceeds generally as discussed above, by first situating a local primary standard calibration light source within the process chamber at a location where the plasma light is most visible to the chamber viewport window (or adjacent to the process chamber in a separate light source chamber). The spectrograph, optical coupling system, and the process chamber are then calibrated to the local primary standard as generally discussed above. The process can be repeated for each spectrograph coupled to a separate process chamber. As a result, the separate spectrographs will then be calibrated to the local primary standard, but their calibrations account for changes in the throughput caused by any part of the optical system associated with the spectrograph, including the portion within the process chamber.

Optionally, a reference spectrograph may be calibrated as described above and the response of the reference spectrograph used to calibrate other spectrographs. Initially, a reference spectrograph is selected and coupled to a process chamber for receiving light from a local primary calibration light source that is situated either within the process chamber or adjacent to the process chamber in a separate light source chamber. The output response of the reference spectrograph can then be used as a secondary standard for calibrating one or more production spectrographs with different light sources in a subsequent calibration. During this part of the calibration, a production reference light source is substituted for the local primary standard calibration light source. A production spectrograph is optically coupled to the chamber with the reference spectrograph. Optimally, the production spectrograph is configured as it will be used to monitor the optical spectrum from the chamber. The reference and production spectrograph simultaneously receive light from the production light source. The output of the production spectrograph can then be calibrated to the response of the reference spectrograph as discussed above. The reference spectrograph can then be uncoupled from the chamber and used to calibrate other production spectrographs coupled to other chambers using only a production reference light source as described above. Care should be taken to arrange optical fiber and other optical coupling components identically for the reference spectrograph on each chamber. The integrity of a production reference spectrograph can be periodically checked against the secondary standard, the output of the reference spectrograph, by coupling the reference unit to the process chamber and comparing its output with the output of the process chamber for the same light source. Alternatively, rather than relying on only one calibration to the local primary standard for every chamber, the reference spectrograph may be recalibrated to a local primary standard calibration light source for each chamber. Then, the calibrated output response from the reference spectrograph to the production reference light source is used to calibrate a production spectrograph coupled to that chamber.

Alternatively, the reference spectrograph and production spectrographs may not receive light from the production light source simultaneously. In that case, the reference spectrograph is initially optically coupled to a process chamber and receives light from a production reference light source. Calibrated spectral data is gathered for the chamber using the reference spectrograph, and the calibrated output of spectral data is recorded. The reference spectrograph is then removed from the process chamber. Those measurements now become the secondary standard for calibrating a production spectrograph with the production reference light source. The uncalibrated production spectrograph is coupled to the process chamber and receives light from the production reference light source. Its output is then calibrated using the calibrated output of spectral data recorded from the reference spectrograph. The process can then be repeated on other process chambers for different production spectrographs.

BRIEF DESCRIPTION OF THE SEVERAL VIEWS OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIG. 3 is a diagram of a calibration system in accordance with an exemplary embodiment of the present invention;

Figure 1:
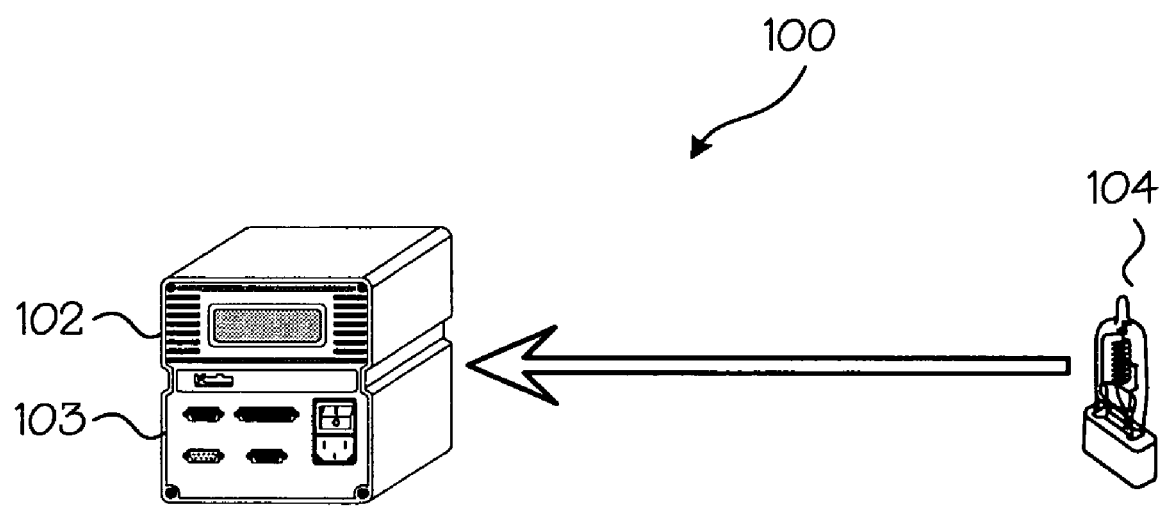
FIG. 1 is a diagram of a spectrographic calibration system as known in the prior art.

Other features of the present invention will be apparent from the accompanying drawings and from the following detailed description.

DETAILED DESCRIPTION OF THE INVENTION

Element Reference Number Designations

100: Prior Art Calibration System
102: Production Spectrograph
103: Detector
104: Production Light Source
200: Spectrograph Calibration System
201: Spectrograph Calibration Module
202: Production Spectrograph(s)
203: Optical Detector Production Reference Light
204: Source
205: Calibrated Spectrograph Output Local Primary Standard
206: Calibration Light Source Uncalibrated Spectrograph
207: Output
208: Integrating Sphere
210: Reference Spectrograph
213: Optical Detector
300: Spectrograph Calibration System
301: Spectrograph Calibration Module
302: Production Spectrograph
303: Optical Detector Production Reference Light
304: Source
305: Calibrated Spectrograph Output Local Primary Standard
306: Calibration Light Source Uncalibrated Spectrograph
307: Output
308: Integrating Sphere
310: Reference Spectrograph
313: Optical Detector
314: Collecting Optics Transmission Optics (Optical 316: Fiber)
400: Chamber Calibration System
402: Production Spectrograph
403: Optical Detector
407: Alignment Jig
409: Chamber Reference Light Source
412: Chamber Window
414: Collecting Optics
416: Transmission Optics (Optical Fiber)
420: Process Chamber
422: Interior of Process Chamber
424: Wafer Support
500: Chamber Calibration System
502: Production Spectrograph
503: Optical Detector
507: Alignment Jig
509: Chamber Reference Light Source
512: Chamber Window
514: Collecting Optics
516: Transmission Optics (Optical Fiber)
520: Process Chamber
522: Interior of Process Chamber
524: Wafer Support
540: Reference Light Source Chamber
542: Light Source Chamber Window Light Source Chamber Window
544: Shutter
600: Chamber Calibration System
602: Production Spectrograph
603: Optical Detector
607: Alignment Jig
609: Chamber Reference Light Source
612: Chamber Window
614: Collecting Optics
616: Transmission Optics (Optical Fiber)
620: Process Chamber
622: Interior of Process Chamber
624: Wafer Support
640: Reference Light Source Chamber
642: Light Source Chamber Window Light Source Chamber Window
644: Shutter
646: Light Source Lens (Mirror)
648: Plasma Light Mimic Optical emission spectroscopy is a sensitive technique for monitoring the state of a plasma. Often it is desirable to recreate, as nearly as possible, a set of conditions in a plasma environment such as in industrial processes that use a plasma environment for etching, deposition, or other purposes common in the semiconductor industry. It is sometimes advantageous to create identical conditions in multiple process chambers. Alternatively, it can be helpful in certain circumstances to return a process chamber to a particular prior state. Optical emission spectroscopy affords a means to do this. The optical emission from a plasma contains contributions from many distinct atomic and molecular states. The identity and the relative intensity of these emissions are sensitive indicators of the precise state of the plasma. Therefore, by monitoring and recording these aspects of the optical spectrum from a plasma chamber at a given time, it would be possible, at least in principle, to adjust the chamber at a later time, or even a different chamber, to recreate the state of the optical emission spectrum, and therefore, the state of the plasma.

Because the optical emission spectrum depends sensitively on the state of the plasma, it is often found that the value of some important process parameter can be inferred from an analysis of the optical spectrum, particularly from the intensity of the emissions. Therefore, the optical spectrum can also serve as a part of a feedback system for control of the plasma or as a tool to measure some important process parameter.

There exists a difficulty associated with the implementation of these designs, however. The customary way to monitor the optical spectrum in an industrial plasma tool is to use an optical monitoring system which consists of a photodetector-array-based optical spectrometer and an optical coupling system to bring the light from the plasma in the interior of the chamber to the spectrometer. The optical spectrum is recorded as a series of light intensity measurements in a set of narrow spectral bands, typically repeated at specific time intervals. The difficulty is that the recorded spectrum is influenced by factors other than the properties of the light emitted by the plasma. These include the wavelength and intensity calibrations of the spectrometer as well as the state of the optical coupling system. The spectrometers typically employed in these applications are not necessarily calibrated so that the response of one matches that of another when exposed to the same input light source. Another problem is that the window into the plasma chamber may become coated with contaminants which absorb or scatter an unknown fraction of the light. Another problem is that the efficiency of the rest of the coupling system may change in response to unavoidable perturbations or variations in the setup. In order to take full advantage of the potential of optical emission spectrum monitoring for the purposes mentioned above, it is desirable to eliminate or compensate for these extraneous influences, so that any change observed in the recorded spectrum can be attributed to a real change in the optical emission occurring in the chamber.

One attempt at eliminating or at least quantifying these extraneous influences is disclosed in U.S. Pat. No. 6,246,473 to Smith. There, a light source that is external to the process chamber is used to calibrate a spectrometer, optical coupling system, or both, in order to compensate for changes which occur due to, for example, window clouding. The calibration device has dual optical paths, one path for making optical measurements through the window and the other path for evaluating the state of the inner surface of the window using external calibration light sources that reflect off of the window surfaces. The second optical path terminates at one or more calibration light sources that are external to the process chamber. One benefit of this methodology is that the state of the chamber, at least with regard to the throughput of the inner surface of the optical viewport window to the spectrograph, can be adjusted to a calibration light source and then future states can be compared to the initial calibration measurement. Changes in transmission that occur due to viewport window clouding can be recognized and compared to the calibration state used for adjusting the optical measurement during production. This method relies on external calibration light sources for establishing the state of the throughput path.

What is needed is an approach to address these extraneous influences that not only enable operators to compare optical measurements from the same chamber, but also to compare measurements obtained from different chambers. Additionally, it would be advantageous to limit the reliance on calibration light sources in these approaches.

In accordance with one exemplary embodiment of the present invention, a stable optical spectrograph is combined with a stable optical coupling system and the response of the spectrograph is calibrated, as well as the throughput of an associated optical coupling system, so that the optical measurements can be duplicated at will. The spectrograph should be stable in the sense that, for a constant input light level, variations in output are small compared to the chamber-to-chamber variation and process variations to be measured. By appropriate design, a spectrograph can be designed to be stable. The main components of such a design are: mechanical rigidity; temperature stabilization of the detector and electronics; and avoidance of the use of phosphors to detect ultraviolet light. The SD1024 spectrograph available from Verity Instruments, Inc. of Carrollton, Tex. is an example of a suitable stable spectrograph. It may appreciated that the type spectrograph that is commonly used in the semiconductor industry for making optical measurements generally comprises at least three functionally separate components: a light dispersing component for dispersing light into a spectrum, an optical detector for converting the spectral intensity at a particular wavelength into electronic data of the intensity, and processing capability, software and/or firmware for converting the electronic data of the intensity into calibrated data. Thus, a typical spectrograph will include at least one optical port, optical coupler or other optical component for receiving light, and one or more data connections, ports, or other data transmission component for sending and receiving data and executable program code. Hereinafter these components will be referred to jointly as a spectrograph. It should also be understood than in some contexts the term spectrograph is understood as the combination of a spectrograph and detector but in other contexts the two are considered separate instruments. Since the exact choice of detector depends on the wavelengths of light to be recorded, the use of the term herein acknowledges the ability of the spectrograph and detector to be separate.

More specifically, with regard to the optical coupling system, two primary components should be discussed with regard to their contributions to the extraneous influences to the response of a spectrograph. The more significant component is the optical viewport window to the process chamber. It is often necessary to take special steps to maintain the transmission properties of the window because of the tendency for the inside surface to become contaminated or etched due to the action of the reactive gases in the chamber. Several techniques exist to address this problem, see the discussion of the U.S. Pat. No. 6,246,473 above. However, recently a more reliable method for protecting viewport windows from contamination has been disclosed in U.S. patent application Ser. No. 11/726,958 to Harvey entitled, "Multichannel Array as Window Protection", which is assigned to the assignee of the present invention and is incorporated by reference herein in its entirety. There, a multichannel array is disposed between the viewport window and the interior of a process chamber. In one embodiment, a window chamber is formed between the viewport window and the multichannel array, which is pressurized with process gas. The quantity of channels and the individual dimensions of the channels are designed such that the process gas flows into the interior of the reactor chamber at an extremely low rate, thereby sweeping any contaminants from the production chamber back into the interior of the production chamber before they reach the viewport window, but without interfering with the flow of production gases within the chamber. Since no contaminants or reactive etch compounds ever contact the viewport window, its transmission remains constant.

The second component of the optical coupling system that should be considered in any discussions of extraneous influences to the response of a spectrograph is the mechanism for conducting light from the viewport window to the spectrograph. The optical path between the viewport window and the spectrograph should be optically stable across the spectral range of the spectrograph. The least complicated approach is to place the spectrometer directly behind the viewport window. This is an acceptable approach if the intended field of view is well matched to the numerical aperture of the spectrometer. If it is not, a lens or mirror is required to match the field of view to the acceptance angle of the spectrometer. It is necessary to ensure mechanical rigidity so as to keep the coupling stable. It is also necessary to choose the material of the lens, if one is used, or mirror coating, to be resistant to solarization if short-wave ultraviolet (UV) radiation is present. Another potential source of instability is absorption of light by oxygen or ozone in the air path. If light at wavelengths below 250 nm is present, it may also be necessary to purge the interior volume of the spectrograph and the space between the window and spectrograph, and/or ventilate those spaces to displace any ozone which is created.

Often, fiber optic coupling is preferred in optical monitoring applications because it allows the spectrometer to be positioned in a convenient location. Fiber optic coupling presents special challenges for a stable coupling system. First, fiber optics transmission is subject to degradation upon exposure to UV radiation. If UV radiation is present in the spectrum to be monitored, then care should be taken to select fiber optic components that are resistant to UV radiation. Several technologies are available to minimize these effects (e.g. Optran UV non-solarizing silica fiber from CeramOptec, of East Longmeadow, Mass.), see for instance "Reliability of High NA, UV Non-Solarizing Optical Fibers", Skutnik et al., SPIE Conference at Photonics Europe, April 2004, SPIE paper # 5465-37, which is incorporated by reference herein in its entirety.

Another approach to the UV radiation problem is to actively filter out radiation below a cut-off wavelength. While this potentially reduces the utility of the optical spectrum for process monitoring, fault detection, and endpoint purposes, it will make the fiber transmission more stable and therefore may represent a beneficial trade-off.

The second challenge in using fiber optics is that fiber optic transmission may be affected by changes in the position of the fiber, regardless of where the changes occur along its length. A small change in the bend radius of a fiber optic or fiber optic bundle may cause the throughput to change by an amount which is significant in the context of these applications. Therefore, if the spectrograph is to be moved to a new location after being calibrated, to a fabrication facility for instance, care should be taken to reproduce the exact spatial configuration when coupled to the process chamber as was used during calibrating. The specific fiber configuration might be recorded at the time of calibration and this information forwarded to the location where the instrument will be used. That information could be then be used to reconfigure the optical fiber at destination facility. Alternatively, the constraints for the positions of installation might first be determined at the destination site and those constraints passed on to the manufacturer. Then, the manufacturer could then position the fiber optics during calibration exactly as it will be positioned at the destination facility.

Another option is to confine the fiber in a rigid conduit that is shipped with the spectrograph, thereby ensuring that its positional configuration for calibrating will be duplicated at a remote installation site. In accordance with still another exemplary embodiment of the present invention, the optical fiber may be replaced by a liquid light guide. Liquid light guides are considered less sensitive to small position changes than are conventional glass optical fibers. An example of one such liquid light guide is the Series 250 Liquid Light Guide available from Lumatec Gesellschaft für medizinisch-technische Geräte mbH, Deisenhofen, Germany.

Finally, a means of calibrating the response of the spectrometer is required. The spectrometer and the fiber optic coupler, if used, can be calibrated together as a unit thereby accounting for the extraneous influences of the optical coupler on the calibration. The techniques for providing a radiometric calibration of a spectrometer are known, for instance as discussed in "Spectroradiometric Detector Measurements", Larason et al., NIST Special Publication 250-41, (available on the web at /physics.nist.gov/Divisions/Div844/facilities/phdet/pdf/sp250-41.pdf), which is incorporated by reference in its entity.

FIG. 1 is a diagram of a spectrographic calibration system as known in the prior art. Often, this calibration occurs with the manufacturer of the spectrograph, but may also be performed by the end user. Spectrograph 102 receives spectral radiation from radiation source 104 and disperses the light into a spectrum. Optical detector 103 receives the spectrum from spectrograph 102 and converts the spectral light into raw spectral intensity data (otherwise referred to as uncalibrated spectral data). By knowing intensities and wavelengths of radiation source 104, spectrograph 102 and optical detector 103 can be calibrated to those values. As used hereinafter, an optical spectrograph will be referred alternatively as a spectrograph/detector with the appropriate element reference number for each, or merely as a spectrograph with the appropriate element reference numbers for the spectrograph and detector.

Often, the illumination source used for prior art radiometric calibrations is a single wavelength having a single known reference intensity corresponding to its wavelength (or a narrow band source). In that case, the single wavelength light is received at spectrograph/detector 102/103 and raw spectral data is generated for that wavelength. The raw spectral data is compared to the known reference intensity data for that wavelength and an output calibration coefficient is derived from the comparison of intensities. The output calibration coefficient is applied to all wavelengths measured by the spectrograph, thereby converting the raw spectral data generated by the spectrograph into calibrated spectral data that can be output. Alternatively, radiation source 104 may be a standard broadband illumination source with known spectral intensities. In that case, separate reference output correction coefficients are derived for each wavelength within the spectral range of the spectrograph/detector 102/103.

Figure 13:
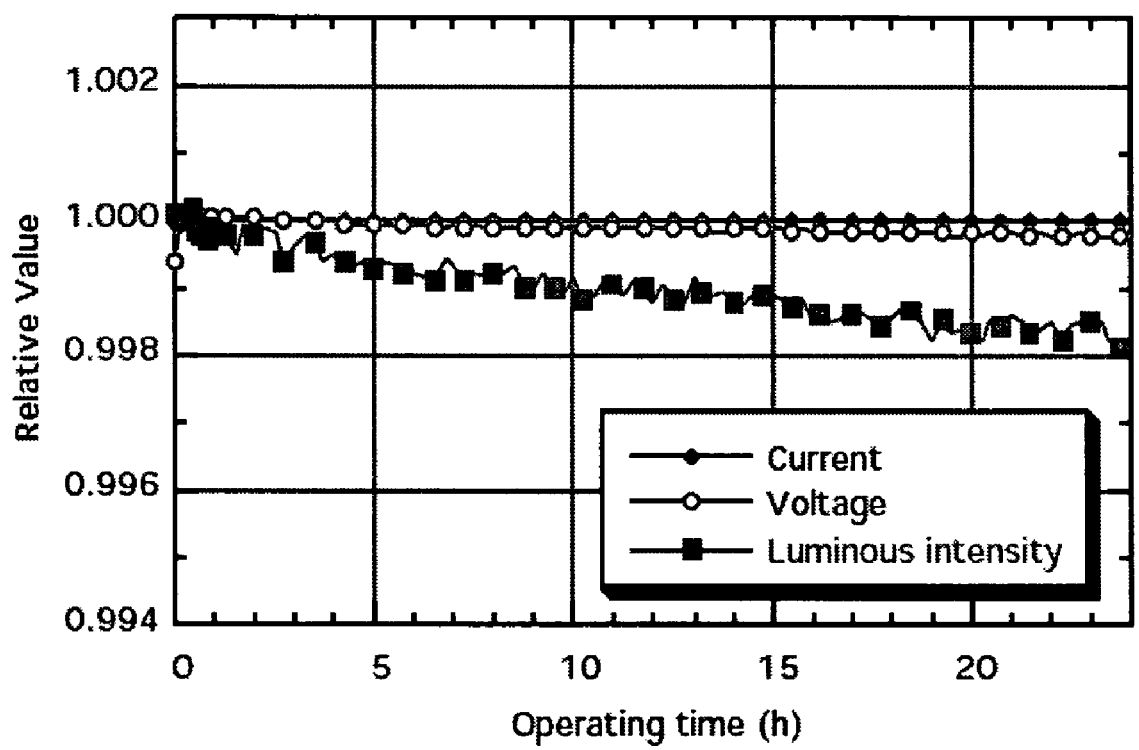
FIG. 13 is a chart showing the drift associated with a standard calibration standard.

It is expected that, at least initially, the present invention will rely on a local primary calibration standard. In accordance with accepted terminology used in the related technological arts, the term "primary standard" refers to "a standard that is designated or widely acknowledged as having the highest metrological qualities and whose value is accepted without reference to other standards of the same quantity" (see the definitions section of the NIST website). As used hereinafter, the term "local primary standard" refers to a primary standard having properties that are traceable to a recognized standard, for instance to an appropriate NIST standard, which is used locally, usually for calibrations. A local primary standard is the best standard available at a given laboratory or facility. For example, a local primary standard calibration light source may be any stable light source with spectral intensities and accuracy that are traceable to a recognized standard, for instance to a suitable NIST standard light source. Local primary standard calibration light sources are readily available from distributors and/or manufacturers of technical light sources, such as the Newport Corporation of Irvine, Calif. Optimally, however, the present calibration procedure should not rely solely on the local primary standard as is common in the prior art. A light source of known and constant output is difficult and expensive to realize, especially over a broad wavelength range that includes ultraviolet light below 300 nm in wavelength. Furthermore, all light sources, even NIST bulbs, are prone to drift as a function of the operating time (see for instance, the intensity drift of an exemplary NIST calibration light source in FIG. 13). Optimally, therefore, the calibration procedure should not rely solely on the local primary standard as a reference source.

In accordance with one exemplary embodiment of the present invention, a single spectrograph system is designated as a reference unit, and the responses of other spectrographs are calibrated to the response of the reference spectrograph for a light source. The reference spectrograph may be calibrated in any suitable manner known in the prior art. Accordingly, the reference spectrograph serves as a secondary standard that is traceable to, for example, a local primary standard calibration light source. Hence, the light source used for calibrating the other spectrographs need not be a calibration light source and the precise spectral intensities of the light need not be known because that information will be accurately measured by the reference spectrograph. Using one spectrograph as a reference spectrograph ensures that multiple spectrographic systems have identical responses to the reference spectrograph, which are all traceable to a primary standard. Thus, the requirement of a calibrated light source is eliminated for those spectrographs.

Furthermore, the present invention does not require the use of any special purpose spectrographic instruments for carrying out the invention. Optical spectrographs known in the prior art are suitable for this purpose, given the conditions imposed above, i.e., mechanical rigidity; temperature stabilization of the detector and electronics; and avoids the use of phosphors to detect ultraviolet light.

Figure 7:
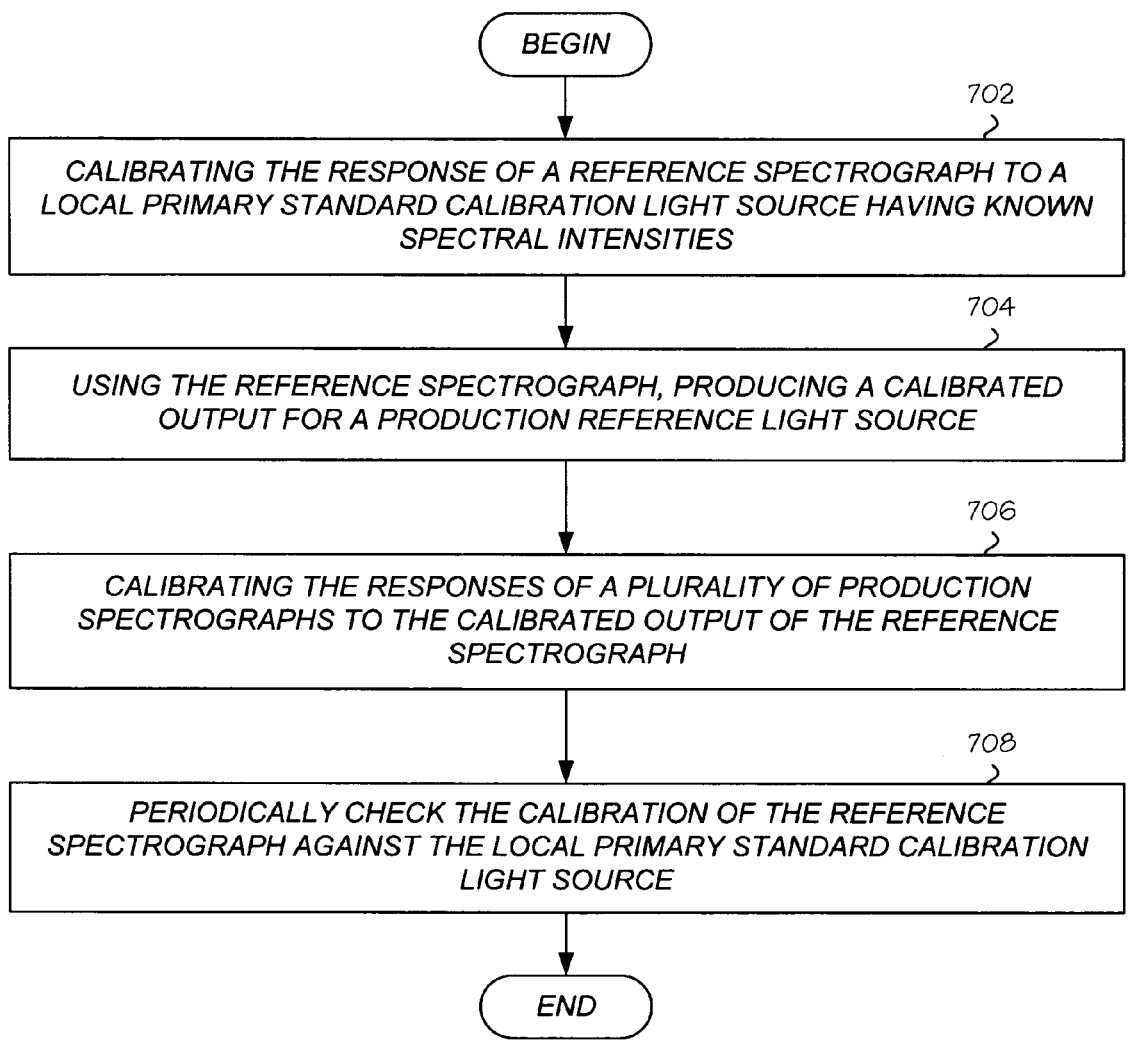
FIG. 7 is a flowchart depicting a generic process for calibrating the responses of a plurality of production spectrographs to a secondary standard that is traceable to a local primary calibration standard in accordance with an exemplary embodiment of the present invention.

FIG. 7 is a flowchart depicting a generic process for calibrating the responses of a plurality of production spectrographs to a secondary standard that is traceable to a local primary standard in accordance with an exemplary embodiment of the present invention. The process begins by calibrating the response of a reference spectrograph to a local primary standard calibration light source with known spectral intensities (step 702). As will be discussed further below, an optical spectrograph is chosen as a reference unit based on several criteria including its mechanical rigidity, temperature stability, etc. A suitable local primary standard calibration light source may actually be two or more calibration light sources, but each should have accuracy and spectral intensities that are NIST traceable. Techniques for providing a radiometric calibration of a spectrometer to a local primary standard calibration light source are well known and any suitable technique can be adopted for calibrating the reference spectrograph without departing from the scope and spirit of the present invention. Alternatively, the reference spectrograph may be calibrated to a calibrated photodetector serving as a local primary standard that is traceable to a recognized standard (not shown in the figures). Here, the reference spectrograph is calibrated using, for example, the well known Substitution Method. In this case, an uncalibrated stable light source that is used in conjunction with a calibrated photodetector and the response of a reference spectrograph is calibrated to the response of local primary standard calibrated photodetector for the uncalibrated light source. In either case, once calibrated the reference spectrograph serves as a secondary standard that any other spectrograph may be calibrated to. Hence, it is expected that the reference spectrograph will produce quantitative spectroscopy measurements for any light source within its spectral range.

With the response of reference spectrograph calibrated, measurements produced by the reference unit can then be used as a secondary standard for calibrating the responses of other spectrographs when both receive radiation from the same source. Since those calibrations do not rely on the availability of a local primary standard calibration light source, a production light source can be used for calibrating spectrographs during manufacturing. For instance, the reference spectrograph receives light from the production light source and, in response, produces a calibrated output of spectral intensity information (step 704). The calibrated intensities generated by the reference spectrograph can then be used as a reference for calibrating other spectrographs using the light generated by production light source (step 706). Spectrographs calibrated in this manner will produce quantitative spectroscopy measurements that are comparable to that of the reference spectrograph. Furthermore, as the use of a local primary standard calibration light source is eliminated for calibrating production spectrographs; these results are attainable without using the local primary standard. The local primary standard calibration light source should be available, however, for periodically checking the calibration of the reference spectrograph against the local primary calibration (step 708). The present calibration process may be implemented at a manufacturing facility or at the location of the end user. More particular aspects of the generic invention will be understood with reference to diagrams and flowcharts discussed below.

Figure 2A:
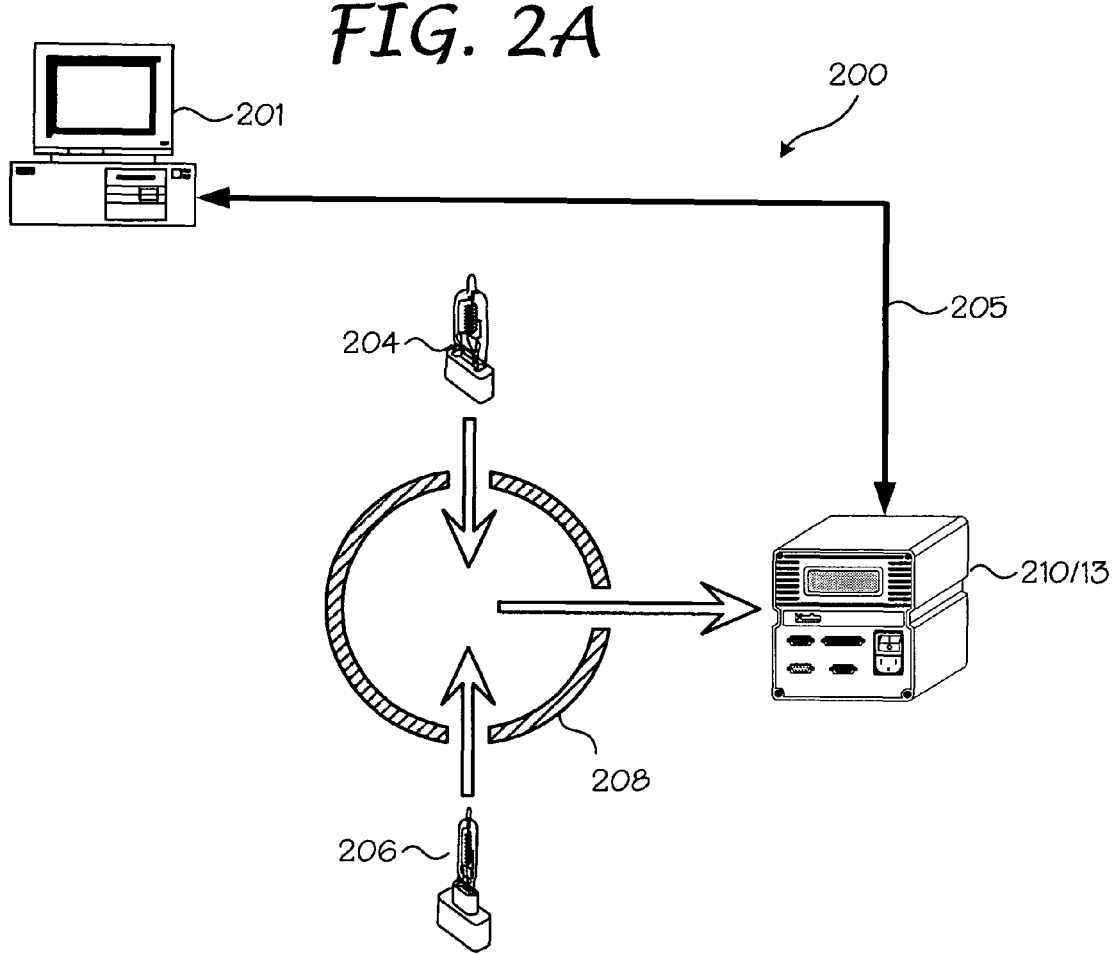
FIGS. 2A and 2B depict a system for calibration of a radiometric optical system in accordance with an exemplary embodiment of the present invention.
Figure 2B:
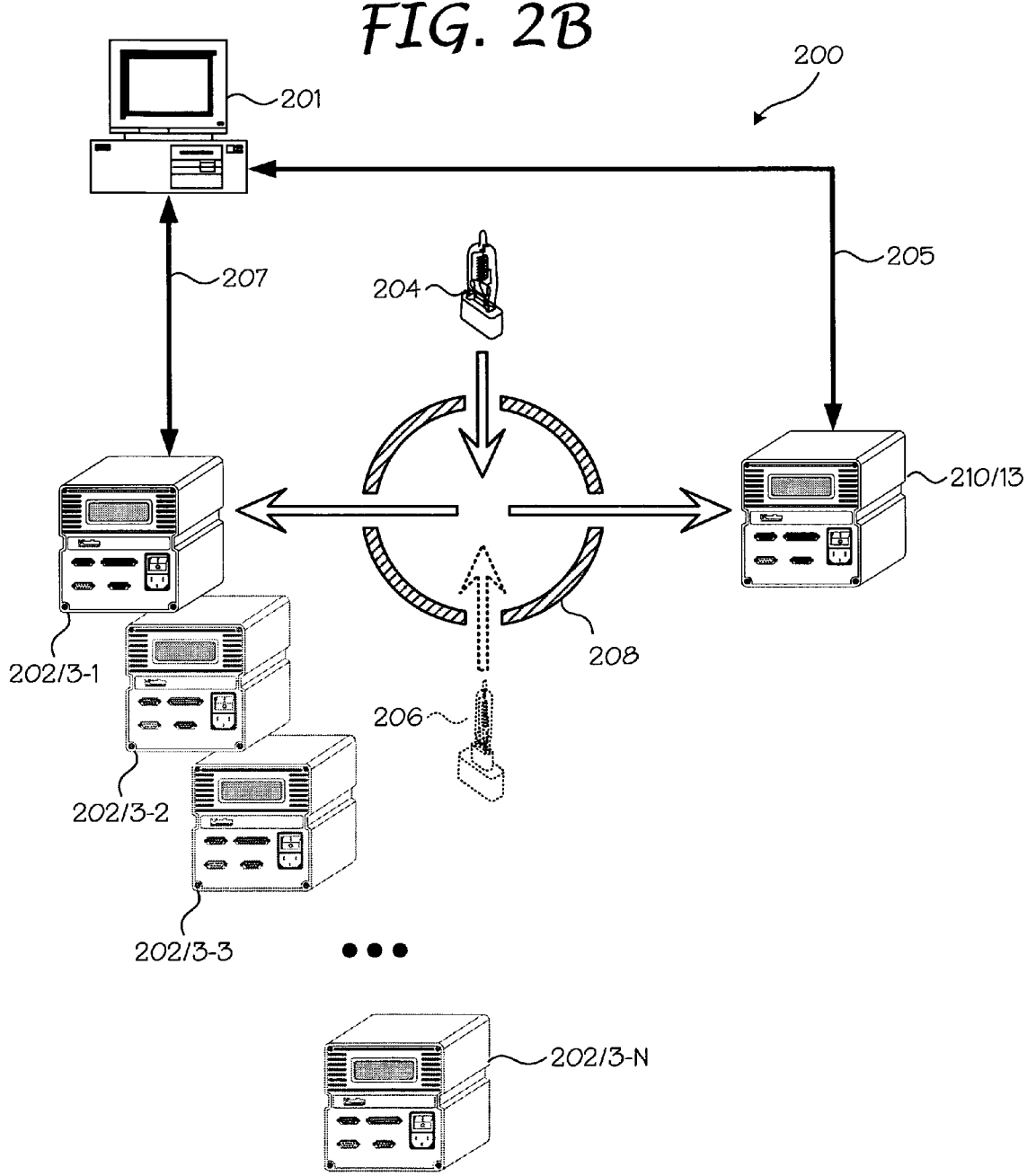
Figure 8:
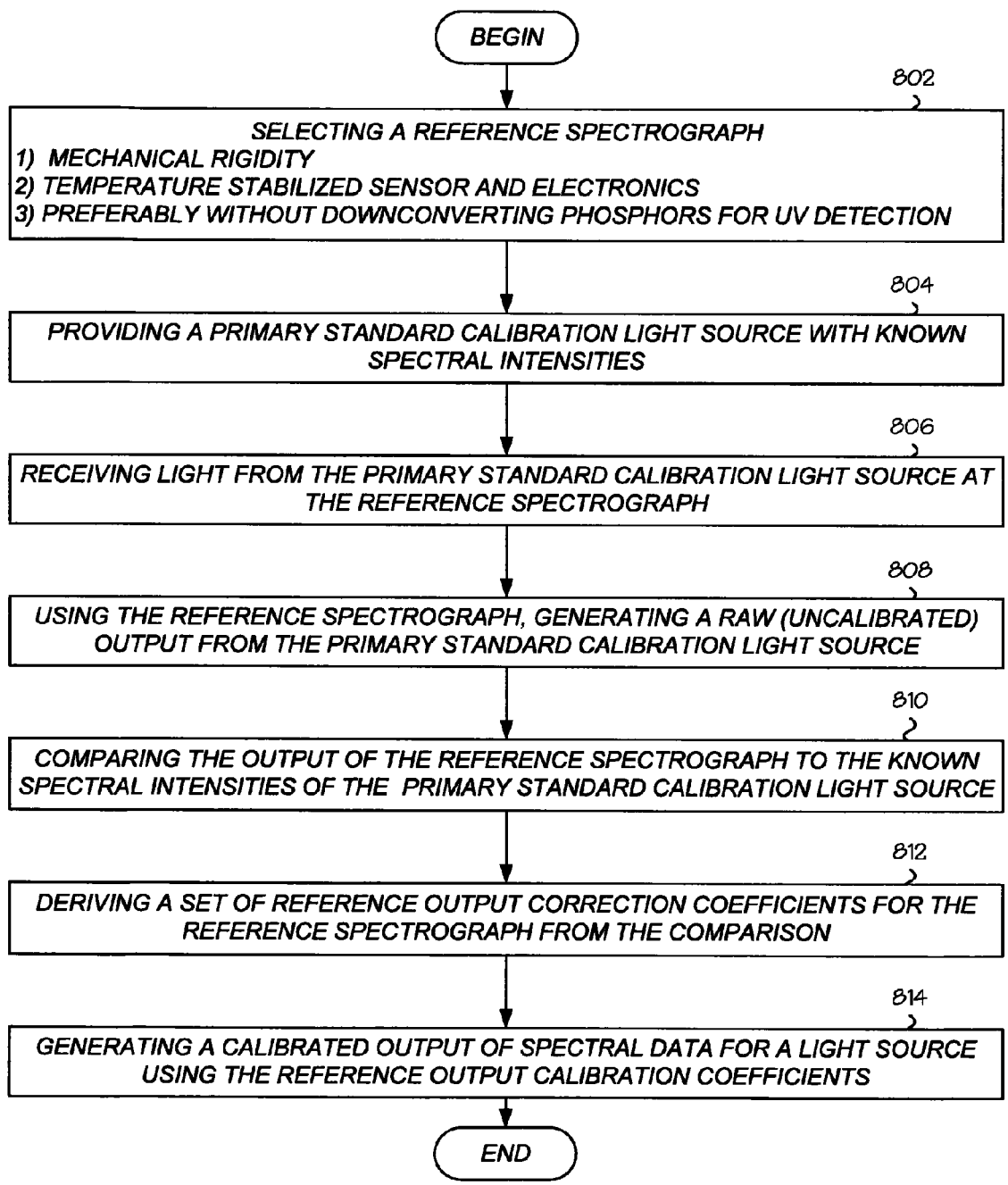
FIG. 8 is a flowchart depicting a process for calibrating the response of a reference spectrograph to a local primary calibration standard in accordance with an exemplary embodiment of the present invention.
Figure 9:
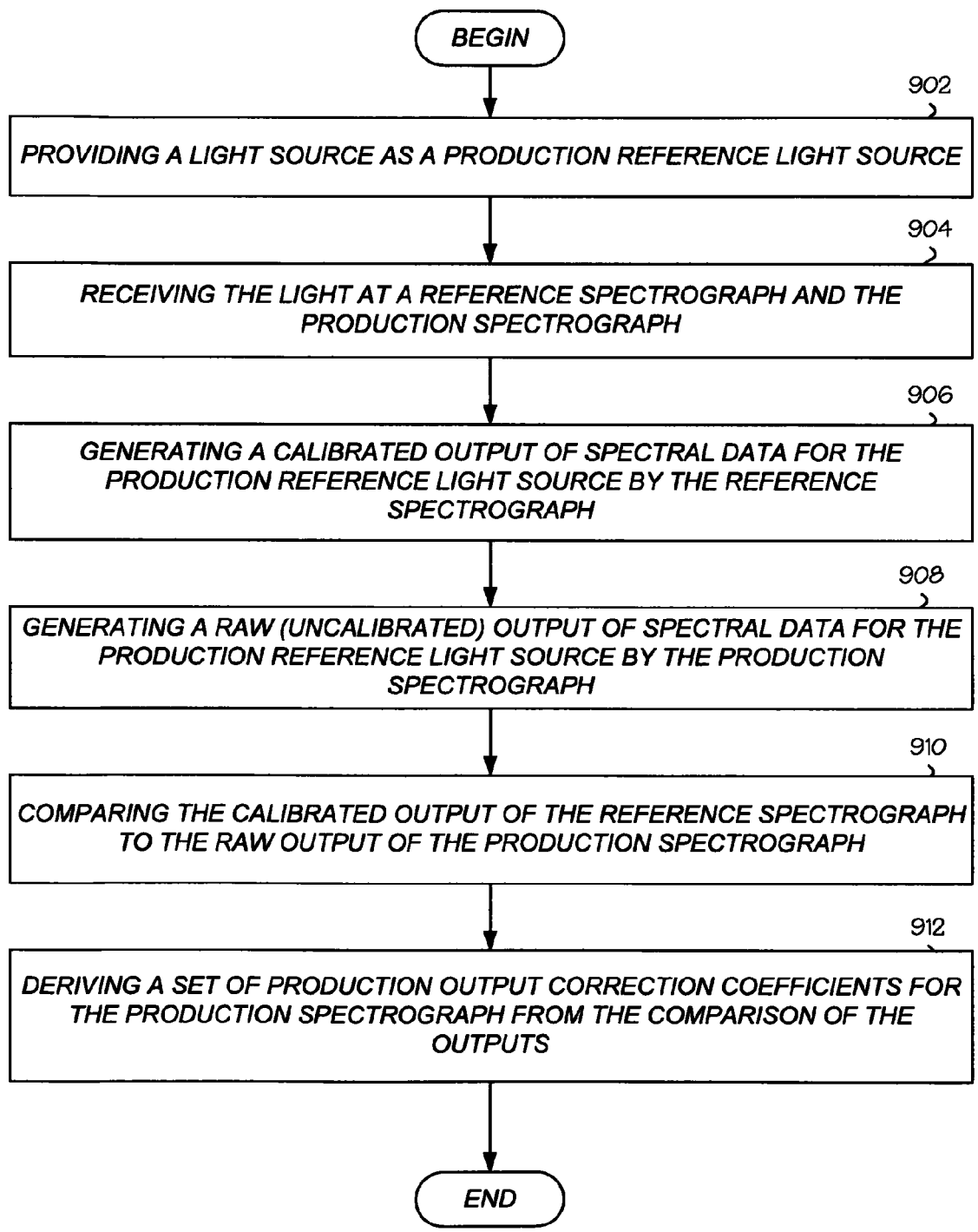
FIG. 9 is a flowchart depicting a process for calibrating the response of a production spectrograph to a secondary standard that is traceable to a local primary standard in accordance with an exemplary embodiment of the present invention.

FIGS. 2A and 2B depict a system for calibration of a radiometric optical system in accordance with an exemplary embodiment of the present invention, such as the method discussed immediately above with regard to the flowchart depicted in FIG. 7. FIG. 2A shows the portion of an exemplary system for calibrating a reference spectrograph and FIG. 2B depicts the portion of an exemplary system for calibrating a plurality of production spectrographs using the reference spectrograph and without employing a local primary standard calibration light source. The term "production spectrograph" is used herein to distinguish spectrographs that may not utilize the local primary standard calibration light source for their calibration but instead are calibrated to the response of a reference spectrograph to a more commonly available light source. While these spectrographs may be calibrated as described below in a production environment, this calibration technique is in no way limited to a production or manufacturer's environment. FIGS. 8 and 9 are flowcharts that depict a process for calibrating a radiometric optical system using a reference spectrograph system in accordance with an exemplary embodiment of the present invention. More specifically, the flowchart depicted in FIG. 8 shows a process for calibrating the response of a reference spectrograph to a local primary standard calibration light source while the flowchart illustrated in FIG. 9 shows a process for calibrating the response of a production spectrograph to a secondary reference standard that is traceable to a local primary standard, each in accordance with exemplary embodiments of the present invention.

Turning now to FIGS. 2A and 8, reference spectrograph/detector 210/213 and local primary standard calibration light source 206 are each optically coupled to separate ports on integrating sphere 208. As mentioned above, a spectrograph selected as a reference should be stable for a constant input light level and variations in its output should be small compared to the chamber-to-chamber variations and process variations (step 802). Consequently, a reference spectrograph should have: 1) mechanical rigidity, 2) temperature stabilized detector, and 3) its electronics should preferably not rely on phosphors for UV detection. Phosphors that convert UV light to light of longer wavelength, that is easier to detect, can change their conversion efficiency with extended exposure to radiation. A local primary standard calibration light source is provided for the calibration (step 804).

Light is received from local primary standard 206 by spectrograph/detector 210/213 (step 806), via integrating sphere 208. Integrating spheres generally function as a light collector as is generally understood in the relevant technological art. Light rays incident on any point on the inner surface are distributed equally to all other such points, and the effects of the original direction of such light are minimized (a suitable integrating sphere is available from the Newport Corporation). While the use of an integrating sphere is not essential to the present invention, optimally some means should be provided to create a uniform distribution of the radiation to fill the entrance slit of the spectrograph.

Reference spectrograph/detector 210/213 generates a raw, or uncalibrated output in response to receiving light from local primary standard calibration light source 206 (step 808). That output is then compared to the spectral intensities that are known for local primary standard calibration light source 206 (step 810). A set of reference output correction coefficients can then be derived for reference spectrograph/detector 210/213 based on that comparison (step 812). This comparison may be made internally in reference spectrograph/detector 210/213 or may be performed at spectrograph calibration module 201, which is remotely located from reference spectrograph/detector 210/213. These reference output correction coefficients are used in conjunction with an output algorithm to convert the raw spectral data into calibrated spectral data that matches the known intensities of local primary standard calibration light source. Once calibrated, the coefficients can then be used to convert the raw spectral data into a calibrated output of spectral intensities for any light source, such as non-standard light source 204. Alternately, the reference spectrograph may be calibrated with a method, such as the Substitution Method, that employs a NIST traceable detector can be used.

Turning now to FIGS. 2B and 9, local primary standard calibration light source 206 is not used for the remainder of the calibration process and remains idle may be uncoupled from the system altogether. Production reference light source 204 is provided in such a way that the spectral intensities may or may not be known (step 902). Reference spectrograph 210/213 and production spectrograph 202/203-1 receive light from production reference light source 204 (step 904) for instance via integrating sphere 208. As depicted in FIGS. 2B and 3, reference spectrograph 210/213 and production spectrograph 202/203-1 are optically coupled to different ports on integrating sphere 208 for simultaneously receiving light from production reference light source 204. Optimally, however, production spectrograph 202/203-1 is subsequently coupled to the same port as reference spectrograph 210/213 for calibrating as the light from separate ports may contain subtle differences that may degrade the calibration. In either case, reference spectrograph 210/213 produces a calibrated output of spectroscopic data; consequently, the absolute spectral intensities produced by production reference light source 204 are known from the calibrated output of reference spectrograph/detector 210/213 (step 906). Essentially, the calibrated output generated by reference spectrograph 210/213 becomes the de facto calibration standard for calibrating the outputs of other spectrographs receiving light from an identical source, for instance production reference light source 204.

Production spectrograph 202/203-1 generates a raw or uncalibrated output (step 908) and that uncalibrated output is compared to the "known" spectral intensities for production reference light source 204 received as the calibrated output produced by reference spectrograph 210/213 (step 910). By comparing the output of production spectrograph 202/203-1 to that of reference spectrograph 210/213, when both are simultaneously viewing the same source, the requirement for a stable light source of known intensity is eliminated. A set of reference output correction coefficients can then be derived for production spectrograph 202/203-1 based on that comparison. As mentioned above, these reference output correction coefficients convert the raw spectral data from production spectrograph 202/203-1 into calibrated spectral data that matches the known intensities of the production reference light source produced by reference spectrograph 210/213 (step 912). The present calibration process may be repeated for production spectrographs 202/203-1 through 202/203-N. The present calibration process may be invoked locally on any of reference spectrograph 210/213 or production spectrograph 202/203-1 or remotely on spectrograph calibration module 201. It should be recognized that, even though the reference spectrograph has been carefully selected based on the previously noted stability requirements, the integrity of the reference unit should be checked periodically with reference to the local primary standard.

If the production spectrograph 202/203-1 and the reference spectrograph 210/213 are coupled to the light source using fiber optics, then the condition that both sources are simultaneously viewing the same source is not realized because the transmission properties of the respective fiber optics will, in general, be different. Minute differences in fiber optic bundle transmission is the single largest perturbation that limits the precision that can be achieved, even with fiber optic bundles that are new and manufactured to be identical. The differences between any two fiber optic bundles are almost constant in the short term, however. Because of this, their perturbative effect can be removed to a good approximation by making two measurements and exchanging the fiber bundles between measurements. The measurements $M_1$ and $M_2$ are measurements of the ratio of signals $S_{prod}$ and $S_{ref}$ perturbed by the transmission $T_1$ and $T_2$ of the two fiber optic bundles:

$$M_1 = (T_1 S_{prod})/(T_2 S_{ref}) \quad (1)$$

$$M_2 = (T_2 S_{prod})/(T_1 S_{ref}) \quad (2)$$

The corrected measurement for the production spectrograph is equal to the quantity $\sqrt{M_1 M_2}$. This is the quantity that would have been measured in a single measurement if both spectrographs had viewed the source directly with no intervening optics.

Figure 10:
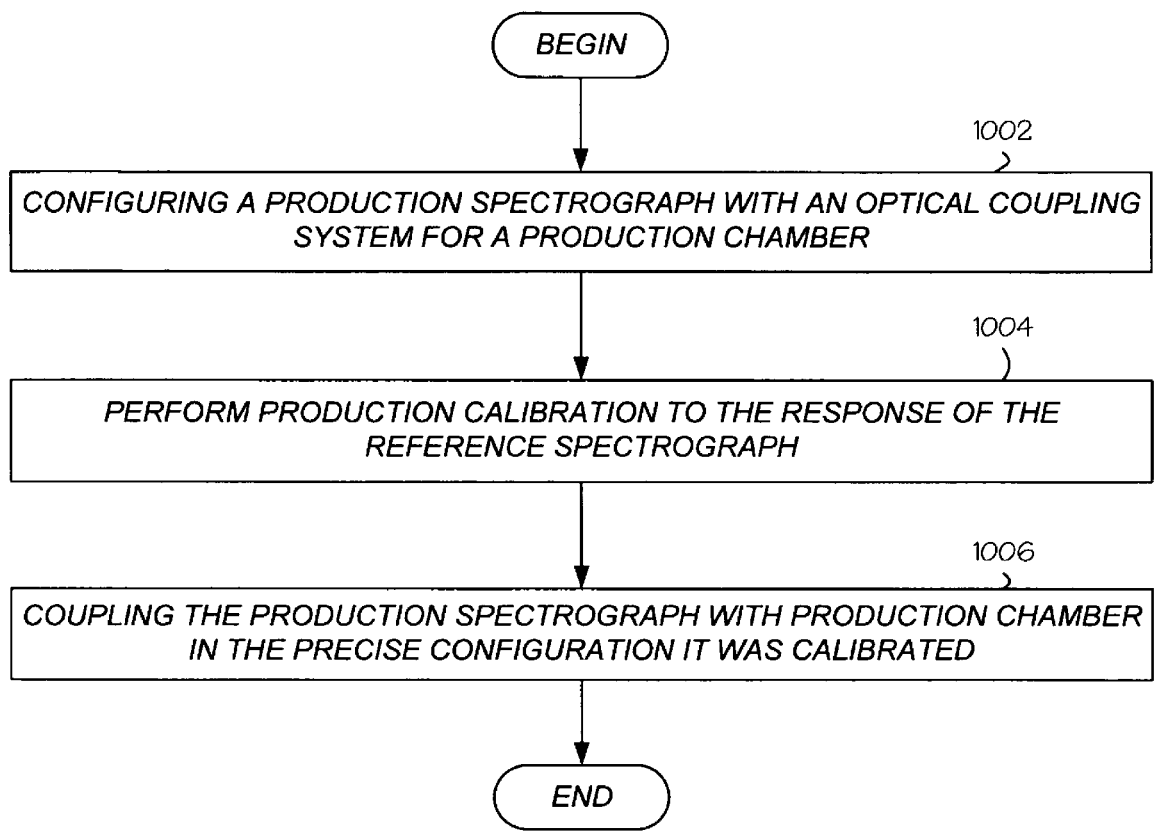
FIG. 10 is a flowchart depicting a process for calibrating the response of a production spectrograph and the throughput of an optical coupling system to a secondary standard that is traceable to a local primary standard in accordance with an exemplary embodiment of the present invention.

In accordance with another exemplary embodiment of the present invention, the calibration of a spectrograph and associated coupling optics can be performed in stages in order to account for changes in the optical throughput due to shipping or the addition of other optical components. The first and most difficult part is performed at the point of manufacture of the spectrometer. This process is graphically depicted in FIGS. 3 and 10; FIG. 3 is a diagram of a calibration system in accordance with an exemplary embodiment of the present invention and FIG. 10 is a flowchart depicting a process for calibrating the response of a production spectrograph and the throughput of an optical coupling system to a secondary standard that is traceable to a local primary standard. There, production spectrograph 302/303 is matched with optical fiber 316 and collecting optics 314 (step 1002). If optical fiber is used, the fiber should be arranged for the calibration identically as it will be used with the process chamber. A small change in the bend radius of an optical fiber or fiber optic bundle may cause the throughput to change by an amount which is significant. If that information is unavailable, the arrangement of the fiber during calibration can be noted and passed on to the fabrication facility. Alternatively, the fiber optic can be confined in a rigid conduit.

Production spectrograph 302/303 is then calibrated with its optical fiber 316 and collecting optics 314 as described above with regard to the process illustrated in the flowchart depicted in FIG. 10 (step 1004). Essentially, collecting optics 314 are optically coupled to an uncalibrated light source, such as light source 304, that produces a light with or without any known spectral intensities, for instance through integrating sphere 308. The light is received at both production spectrograph 302/303 and reference spectrograph 310/313. Production spectrograph 302/303 generates uncalibrated output 307 and reference spectrograph 310/313 generates calibrated output of spectrographic data 305. Here again, the calibrated output of spectrographic data 305 provides a secondary reference for calibrating production spectrograph 302/303. Uncalibrated output 307 is compared to calibrated output 305 and the output of production spectrograph 302/303 is calibrated according to the outcome of the comparison. In so doing, the response of the combined system of the production spectrograph 302/303 and the connected optical coupling system is now calibrated. Production spectrograph 302/303, along with its optical fiber 316 and collecting optics 314, are then coupled to a production chamber (step 1006). Optimally, optical fiber 316 should be configured at the process chamber exactly as it was during calibration in order to lessen the affects on fiber optic transmission due to positional changes in the optical fiber. Alternatively, the optical fiber may be replaced by a liquid light guide or other flexible light guide that is unaffected by changes in its position. For some applications, merely calibrating production spectrograph 302/303 coupled to its optical collections system, as described directly above, may provide the accuracy necessary to recreate a set of conditions in a plasma environment and/or to create identical conditions in multiple process chambers. It does not, however, account for any effects on optical transmission due to the plasma chamber. Therefore, a more complete calibration of the spectrograph includes a second calibration stage performed at the process chamber.

Figure 4:
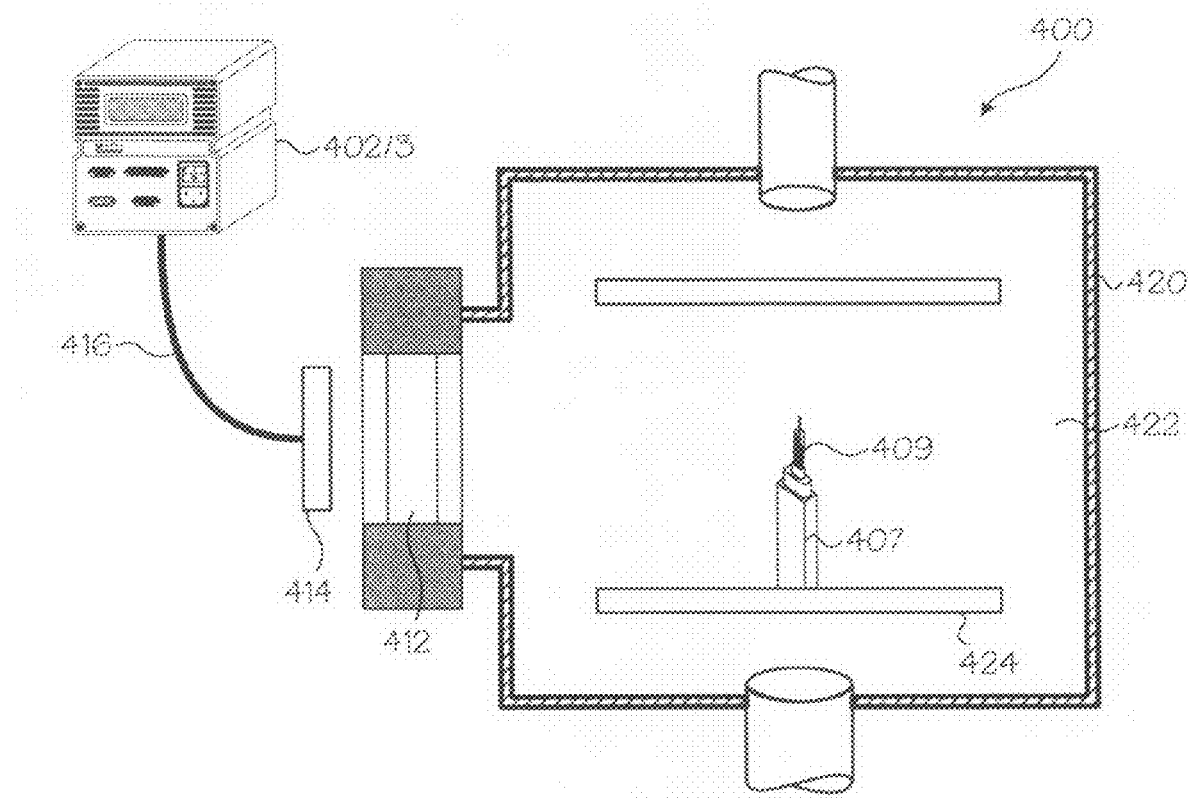
FIG. 4 is a diagram of a calibration system in which a production spectrograph is fitted to a plasma chamber in accordance with an exemplary embodiment of the present invention.

Once the production spectrograph is calibrated to the reference spectrograph, the production spectrograph is coupled to a plasma chamber as shown in FIG. 4. There, production spectrograph 402/403 is optically coupled to fiber optics 416 and optical coupler 414, which is in turn coupled to viewport window 412 of chamber 420. Next, a final "fine-tuning" calibration stage is performed on production spectrograph 402/403 and the optical coupling system, e.g. fiber 416 and optical coupler 414. The fine tuning stage is especially desirable if fiber optics 416 cannot be arranged at the process chamber identical to its configuration during the initial calibration stage. The fine tuning calibration stage is accomplished in situ using stable light source 409 at a single wavelength (or at least narrow band of wavelengths, however fine tuning may also be accomplished using a broadband light source), which is easily obtained at a low cost and in a portable form. Light source 409 is situated in interior 422 of chamber 420 at a location in the chamber where the plasma light is most visible to viewport window 412. The identical position should be used for placement of the light source in all similar chambers. Alignment jig 407 may be utilized to optimize the position of light source 409 and for replicating the position in other process chambers.

Figure 5:
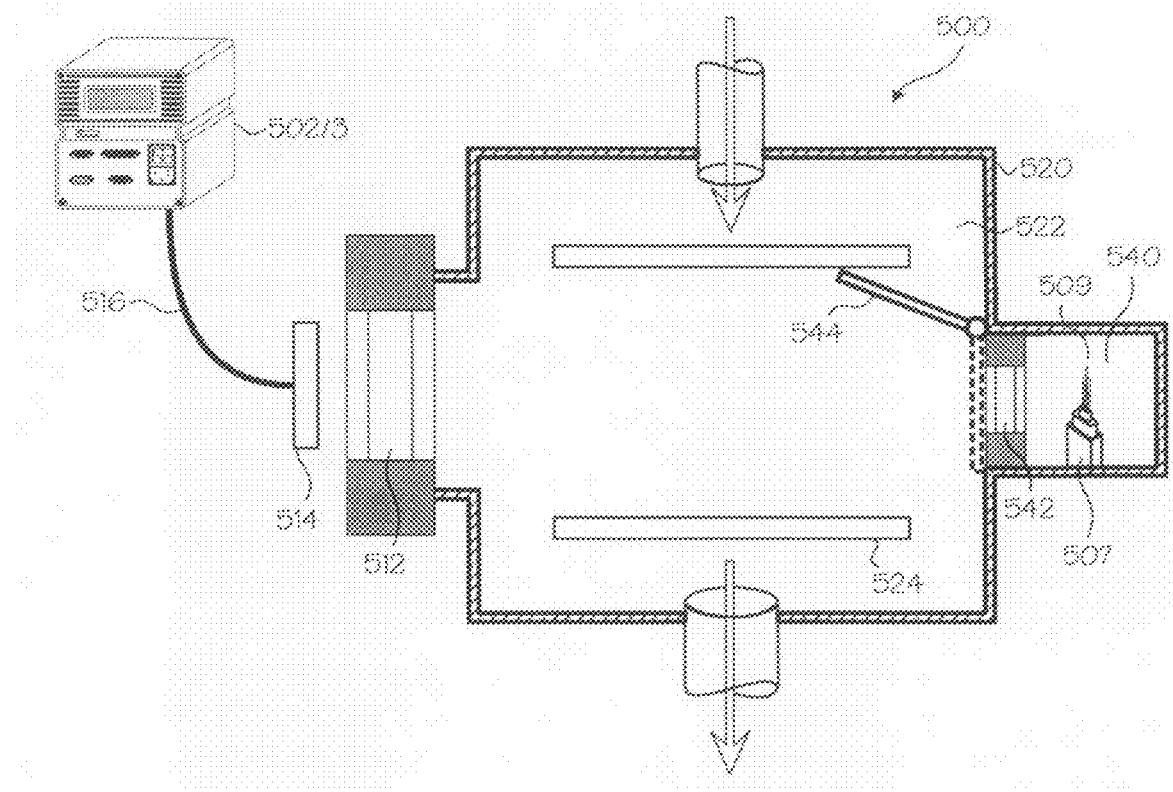
FIG. 5 is a diagram of a calibration system in which the production spectrograph is fitted to the plasma chamber and includes a shuttered light chamber for calibrations in accordance with an exemplary embodiment of the present invention.

Alternatively, as shown in FIG. 5 and in accordance with another exemplary embodiment of the present invention, reference light source chamber 540 may be disposed along the interior of process chamber 520. Optimally, light source chamber 540 may be located on the opposing wall of process chamber 520 to viewport window 512 and along the optical path where the plasma is most visible to the viewport window. There, light source 509 and optional alignment jig 507 are protected from the plasma by window 542, which is itself covered by movable shutter 544. Shutter 544 is opened for calibration and closed when the plasma is on to protect the window 542.

Figure 6:
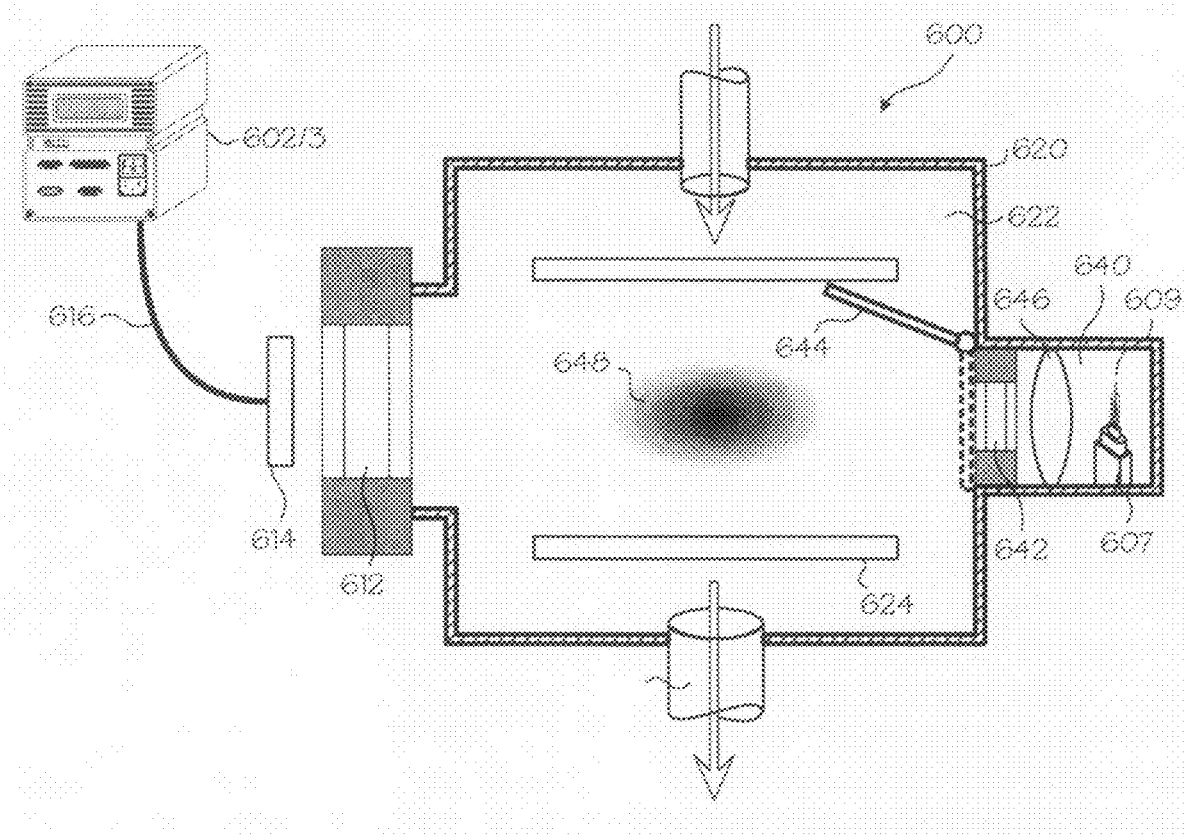
FIG. 6 is a diagram of a calibration system in which a production spectrograph is fitted to a plasma chamber and includes lens and/or a mirror for projecting a real image of the light into the interior of the plasma chamber in accordance with an exemplary embodiment of the present invention.

In accordance with still another exemplary embodiment of the present invention, and as shown in FIG. 6, light source 609 is disposed within reference light source chamber 640 and behind window 642, movable shutter 644 and behind optical components 646 for producing plasma light mimic 648 at a predetermined location within interior 622 of chamber 620. It is expected that the optimal location for projected plasma light mimic 648 is identical to the position of the plasma in the chamber, or alternatively, at the optimal position for locating a physical light source, i.e., in a path where the plasma is most visible to viewport window 612 (as described above with regard to FIG. 5). Optical components 646 may be one of concave mirrors and converging lenses. Using optical system 646, more light may be transferred through chamber 620 and into spectrograph 602/03 than in using only window 642 (as discussed immediately above with regard to the discussion of FIG. 5). Optimally, the shape of the illumination pattern within interior 622 mimics the light generated by the plasma (as suggested by the figure). In accordance with another exemplary embodiment of the present invention, optical system 646 may create a real image of the light source 609 at the position for locating a physical light source in the path where the plasma is most visible to viewport window 612. In either case, both imaging and non-imaging optical systems may be modified as described herein.

Figure 11:
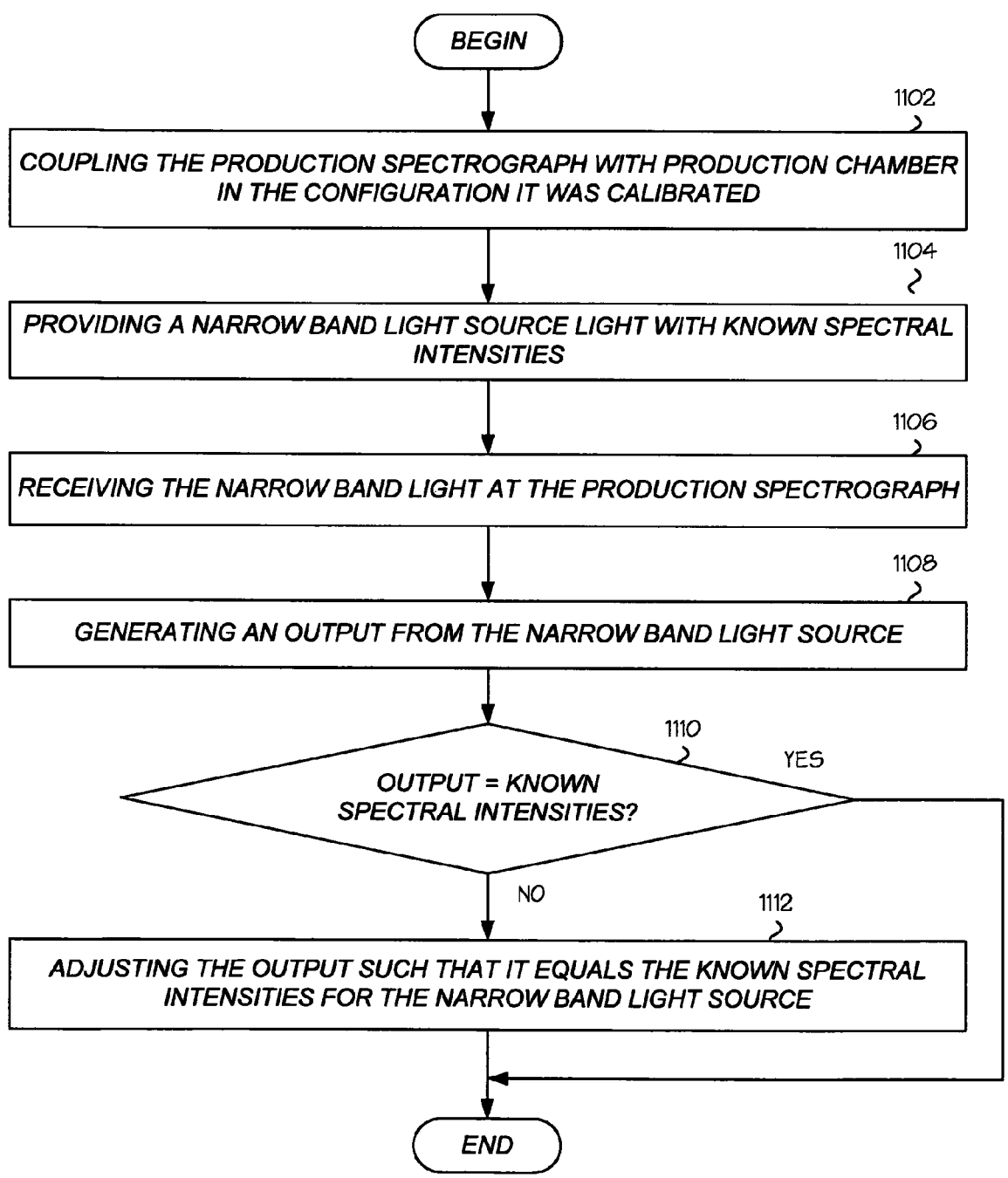
FIG. 11 is a flowchart depicting the response of a process for calibrating a production spectrograph and the throughput of an optical coupling system to a secondary standard that is traceable to a local primary standard while coupled to a process chamber in accordance with an exemplary embodiment of the present invention.

FIG. 11 is a flowchart depicting a process for performing a fine tuning calibration stage on a production spectrograph and its optical coupling system while coupled to a process chamber in accordance with an exemplary embodiment of the present invention. The process will be described with reference to FIG. 4, however any of the system configurations depicted in FIGS. 4-6 will work equally well with the fine tuning calibration stage. The fine tuning calibration stage begins by optically coupling production spectrograph 402/403, optical fiber 416, and optical coupler 414 to viewport window 412 of chamber 420 (step 1102). Next, narrow band light source 409 with a known intensity(-ies) is situated in interior 422 of chamber 420 at a predetermined location (step 1104). Light from narrow band light source 409 is then received by production spectrograph 402/403 (step 1106), which produces an output (step 1108). Recall that the response of production spectrograph 402/403 has been previously calibrated to the output of a reference spectrograph, and therefore its output is at least partially calibrated. Furthermore, production spectrograph 402/403 has not been calibrated to the optical throughput of process chamber 420 (including viewport window 412). How well production spectrograph 402/403 is calibrated will be evident by comparing its output to the known spectral intensity for narrow band light source 409 (step 1110). If the comparison is favorable, no further calibration is necessary and the process ends. If, on the other hand, the comparison indicates that a fine tuning calibration is necessary, then the output produced by production spectrograph 402/403 for the spectra associated with narrow band light source 409 is set to the known spectral intensity (-ies) of narrow band light source 409 (step 1112). This may be accomplished by making a wavelength-independent adjustment to the intensities across the entire spectral range of production spectrograph 402/403.

Figure 12:
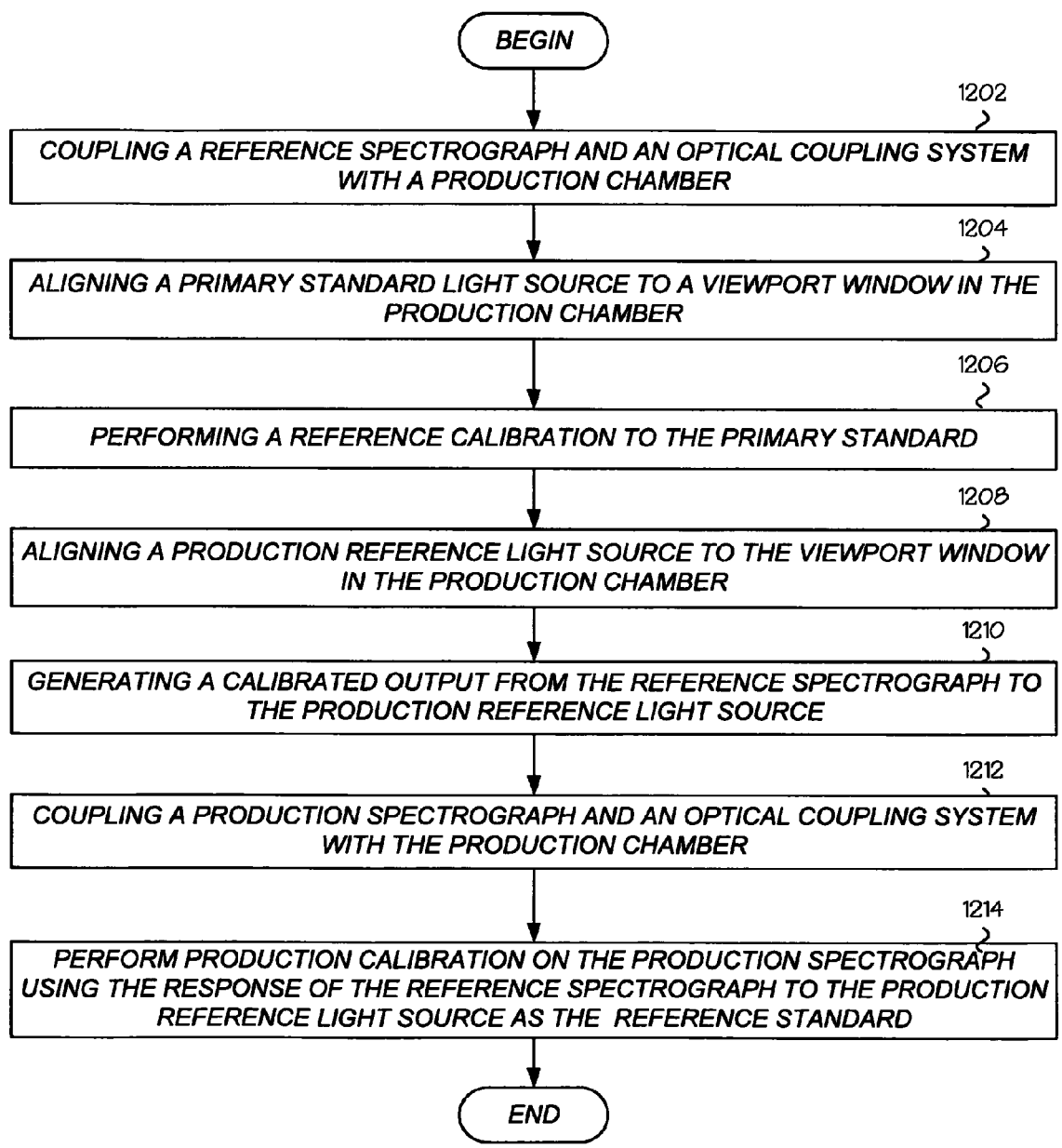
FIG. 12 is a flowchart depicting a process for calibrating the response of a reference spectrograph and the throughput of an optical coupling system while coupled to a process chamber in accordance with an exemplary embodiment of the present invention.

In accordance with still another exemplary embodiment of the present invention, the reference spectrograph and the throughput of its optical coupling system may be calibrated together with the process chamber. It is expected that this technique would be accomplished entirely at the fabrication facility. FIG. 12 is flowchart depicting a method for calibrating the response of a reference spectrograph, the throughput of an optical coupling system and a process chamber in accordance with an exemplary embodiment of the present invention. Initially, a reference spectrograph, along with its optical coupling system, is coupled to a production chamber as described with regard to any of FIGS. 4-6 (step 1202). Next, a local primary standard is aligned within the production chamber (step 1204). The local primary standard may be positioned within the volume of the plasma chamber, as depicted in FIG. 4; within a light chamber within the field of view to the acceptance angle of the reference spectrometer view, as depicted in FIG. 5; or projected as a real image from the light chamber, as depicted in FIG. 6. The reference spectrograph is then calibrated to the local primary standard as discussed above with regard to the method illustrated by the flowchart depicted in FIG. 8. That is, the light is projected by the light source and received at the reference spectrograph, which produces an output. The output is then compared to the known spectral intensities for the local primary standard and a set of output correction coefficients are derived for the reference spectrograph which convert the raw intensity output to the known spectral intensities for the local primary standard. Consequentially, the reference spectrograph and throughput from the chamber to the spectrograph are all calibrated to the local primary standard calibration light source.

Here, it would be possible to commence making optical measurements in a production environment using the reference spectrograph. The integrity of the spectrograph could be verified periodically with the local primary standard calibration light source, by repositioning the local primary standard within the volume of the plasma chamber, as depicted in FIG. 4, by opening the shutter of the light chamber to project light from the local primary standard into the volume of the production chamber, as depicted in FIG. 5, or by projecting a real image in the production chamber from the local primary standard calibration light source in the light chamber, as depicted in FIG. 6. Since each and every spectrograph coupled to a process chamber in a facility would require calibration to the local primary standard, the aforementioned benefits of a reference spectrograph would be unrealized.

Therefore, in accordance with still another exemplary embodiment of the present invention, the output of the reference spectrograph is utilized as a secondary calibration to calibrate a second spectrograph that is also coupled to a process chamber. In so doing, the second spectrograph, chamber, and the throughput from the chamber to the spectrograph are all calibrated to a secondary standard that is traceable to a local primary standard, but without utilizing the local primary standard calibration light source for its calibration.

Returning now to FIG. 12, one calibration method can be realized by substituting the local primary standard calibration light source with a production reference light source and configured as shown in any of FIGS. 4-6 (step 1208). The intensities of the production reference light source may be known or unknown. Next, a calibrated output is generated by the reference spectrograph in response to the light emitted by production reference light source (step 1210). A production spectrograph is then coupled to the process chamber (step 1212) (not specifically shown in the figures) and an uncalibrated output is generated by the production spectrograph in response to the light emitted by production reference light source. The production spectrograph can then be calibrated using the response of the reference spectrograph to the production reference light source (step 1214).

Optimally, the reference spectrograph is coupled to the process chamber simultaneously with the production spectrograph in such a manner as to utilize a common optical path through the chamber and chamber window, thereby enabling both spectrographs to receive a calibration light from the production reference light source spectrograph simultaneously. In so doing, the integrity of the calibration of the production spectrograph is periodically verified with the production reference light source by comparing the output from the production spectrograph to the calibrated output from the reference spectrograph.

It is expected that the calibration procedure using a single reference spectrograph described immediately above would be performed for each process chamber at a facility. Optionally, the initial reference calibration (steps 1204 and 1206) may be omitted for subsequent chambers if the variations in the calibrated outputs obtained from subsequent chambers are small compared to process variations to be measured.

Using the calibration techniques discussed above, any calibrated spectral data obtained from any production spectrograph may be compared to calibrated spectral data obtained from any other production spectrograph on another process chamber. Furthermore, because the spectral data is calibrated to a spectral standard specification, via the reference spectrograph, any previous state of the optical emission spectrum from the chamber can be recreated. Alternatively, the state of the optical emission spectrum from another chamber can be recreated in the present chamber. In addition to enabling cross-instrument and time-based comparisons, any calibrated reference spectrograph can be physically relocated to another process chamber without recalibrating the spectrograph (however, the reference output correction coefficients for the spectrograph may be verified by comparing the calibrated spectral data obtained from the production spectrograph to the calibrated spectral data obtained by the reference spectrograph).

The exemplary embodiments described below were selected and described in order to best explain the principles of the invention and the practical application, and to enable others of ordinary skill in the art to understand the invention for various embodiments with various modifications as are suited to the particular use contemplated. The particular embodiments described below are in no way intended to limit the scope of the present invention as it may be practiced in a variety of variations and environments without departing from the scope and intent of the invention. Thus, the present invention is not intended to be limited to the embodiment shown, but is to be accorded the widest scope consistent with the principles and features described herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method for calibration of a radiometric optical monitoring system used for fault detection and process monitoring, comprising:
   calibrating a first spectrograph to a local primary standard;
   receiving light from a first light source at the first spectrograph, wherein the first light source emits a plurality of unknown spectral intensities;
   receiving light from the first light source at a second spectrograph;
   generating calibrated spectral information in response to receiving light from the first light source at the first spectrograph;
   generating uncalibrated spectral information in response to receiving light from the first light source at the second spectrograph; and
   calibrating the second spectrograph to the calibrated spectral information generated by the first spectrograph.

2. The method for calibration recited in claim 1, wherein the local primary standard is a calibrated photodetector with a response that is traceable to a known standard, and calibrating a first spectrograph to a local primary standard further comprises:
   receiving light from a second light source at the first spectrograph;
   receiving light from the second light source at the calibrated photodetector;
   generating calibrated spectral information in response to receiving light from the second light source at the calibrated photodetector;
   generating uncalibrated spectral information in response to receiving light from the second light source at the first spectrograph; and
   calibrating the first spectrograph to the calibrated spectral information generated by the calibrated photodetector.

3. The method for calibration recited in claim 2, wherein the known standard is a National Institute of Standards and Technology (NIST) standard.

4. The method for calibration recited in claim 1, wherein the local primary standard is a second light source.

5. The method for calibration recited in claim 4, wherein the second light source emits a plurality of known spectral intensities.

6. The method for calibration recited in claim 5, wherein the known spectral intensities emitted by the second light source are traceable to a National Institute of Standards and Technology (NIST) standard.

7. The method for calibration recited in claim 4, wherein the first and second spectrographs receive light from the first light source simultaneously.

8. The method for calibration recited in claim 1, wherein calibrating the second spectrograph to the calibrated spectral information generated by the first spectrograph further comprises:
   comparing the uncalibrated spectral information generated by the second spectrograph to the calibrated spectral information generated by the first spectrograph; and
   generating correction coefficients based on the comparison of the uncalibrated spectral information generated by the second spectrograph to the calibrated spectral information generated by the first spectrograph.

9. The method for calibration recited in claim 1, further comprising:
   receiving light from the first light source at a third spectrograph;
   generating uncalibrated spectral information in response to receiving light from the first light source at the third spectrograph; and
   calibrating the third spectrograph to the calibrated spectral information generated by the first spectrograph.

10. The method for calibration recited in claim 1, further comprising:
    optically coupling the second spectrograph to an optical coupling system, said optical coupling system having a throughput level;
    receiving light from the first light source through the optical coupling system; and
    altering the calibration of the second spectrograph in response to the throughput level of the optical coupling system.

11. The method for calibration recited in claim 10, wherein the optical coupling system further comprises fiber optics, the method, further comprising:
    recording spatial configuration of the fiber optics.

12. The method for calibration recited in claim 10, further comprising:
    fine tuning the calibration of the second spectrograph to a third light source.

13. The method for calibration recited in claim 12, wherein fine tuning the calibration of the second spectrograph to a third light source comprises:
    optically coupling the optical coupling system to a viewport window disposed on a process chamber for viewing an interior of the process chamber;
    receiving light from the third light source at the second spectrograph;
    adjusting the calibration of the second spectrograph to spectral information associated with the third light source.

14. The method for calibration recited in claim 13, wherein the third light source emits light at a single spectral wavelength.

15. The method for calibration recited in claim 13, wherein the third light source emits light at a plurality of spectral wavelengths.

16. The method for calibration recited in claim 11, further comprises:
    disposing a third light source within the interior of the process chamber.

17. The method for calibration recited in claim 13, wherein the process chamber further comprises a light chamber disposed along the interior of the process chamber, the method further comprises:
    disposing the third light source within the light chamber of the process chamber.

18. The method for calibration recited in claim 17, further comprising:
    protecting the third light source from plasma and reactants within the interior of the process chamber.

19. The method for calibration recited in claim 13, wherein optically coupling the optical coupling system to a viewport window disposed on a process chamber for viewing an interior of the process chamber further comprises:
spatially configuring the fiber optics based on spatial configuration of the fiber optics during calibration of the second spectrograph.

20. The method for calibration recited in claim 1, further comprising:
fine tuning the calibration of the second spectrograph to a second light source.

21. The method for calibration recited in claim 20, wherein fine tuning the calibration of the second spectrograph to a second light source comprises:
optically coupling the second spectrograph to a viewport window disposed on a process chamber for viewing an interior of the process chamber;
receiving light from the third light source at the second spectrograph;
adjusting the calibration of the second spectrograph to spectral information associated with the third light source.

22. The method for calibration recited in claim 21, wherein the second light source emits light at one or more spectral wavelengths.

23. The method for calibration recited in claim 22, further comprises:
disposing the second light source within the interior of the process chamber.

24. The method for calibration recited in claim 23, wherein the process chamber further comprises a light chamber disposed along the interior of the process chamber, the method further comprises:
disposing the second light source within the light chamber of the process chamber.

25. The method for calibration recited in claim 1, further comprising:
selecting a first spectrograph based on a predetermined level of measurement stability.

26. The method for calibration recited in claim 5, wherein calibrating a first spectrograph to the second light source having known spectral intensities further comprises:
disposing the second light source having known spectral intensities within a view angle for a viewport window; and
optically coupling the second spectrograph to a viewport window disposed on a process chamber for viewing an interior of the process chamber.

27. The method for calibration recited in claim 26, further comprising:
disposing the first light source within a view angle for the viewport window; and
optically coupling the second spectrograph to the viewport window disposed on a process chamber for viewing an interior of the process chamber.

28. The method for calibration recited in claim 27, wherein the first and second spectrographs receive light from the first light source simultaneously.

29. The method for calibration recited in claim 27, wherein the process chamber further comprises a light chamber disposed along the interior of the process chamber, the method further comprises:
disposing one of the first light source and the second light source within the light chamber of the process chamber.

30. The method for calibration recited in claim 29, further comprising:
protecting the one of the first light source and the second light source from plasma and reactants within the interior of the process chamber.

31. The method for calibration recited in claim 27, wherein the process chamber further comprises a light chamber disposed along the interior of the process chamber, the method further comprises:
disposing one of the first light source and the second light source within the light chamber of the process chamber.

32. The method for calibration recited in claim 4, further comprising:
verifying the calibration of the first spectrograph to the second light source.

33. The method for calibration recited in claim 32, wherein verifying the calibration of the first spectrograph to the second light source further comprises:
detecting one of a predetermined time period or a predetermined number of measurements;
receiving light from the second light source at the first spectrograph;
generating calibrated spectral information in response to receiving light from the second light source at the first spectrograph; and
comparing the calibrated spectral information generated by the first spectrograph to the known spectral intensities of the second light source.

34. The method for calibration recited in claim 4, further comprising:
optically coupling the first spectrograph to a first optical coupling system;
receiving light from the first light source through the first optical coupling system,
generating first spectral information in response to receiving light from the first light source through the first optical coupling system at the first spectrograph;
optically coupling the second spectrograph to a second optical coupling system;
receiving light from the first light source through the second optical coupling system,
generating second spectral information in response to receiving light from the first light source through the second optical coupling system at the second spectrograph;
optically coupling the first spectrograph to the second optical coupling system;
receiving light from the first light source through the second optical coupling system,
generating third spectral information in response to receiving light from the first light source through the second optical coupling system at the first spectrograph;
optically coupling the second spectrograph to the first optical coupling system;
receiving light from the first light source through the first optical coupling system,
generating fourth spectral information in response to receiving light from the first light source through the first optical coupling system at the second spectrograph;
wherein calibrating the second spectrograph to the calibrated spectral information generated by the first spectrograph further comprises:
comparing the first spectral information and third spectral information to the second spectral information and fourth spectral information.

35. The method for calibration recited in claim 34, wherein comparing the first spectral information and third spectral information to the second spectral information and fourth spectral information further comprises:

finding a first product of the first spectral information and third spectral information and a second product the second spectral information and fourth spectral information; and a ratio of the first product to the second product.

36. The method for calibration recited in claim 35, wherein the first and second optical coupling systems comprise fiber optics.

37. A system for calibrating a radiometric optical monitoring system used for fault detection and process monitoring, comprising:
- a reference light source;
- a reference spectrograph optically coupled to the reference light source, the reference spectrograph comprising:
  - an optical port adapted for receiving light from the reference light source;
  - computational electronics for converting raw spectral intensity information generated by the reference spectrograph into calibrated intensity information based on a comparison of known spectral intensity information for a local primary standard calibration light source to raw spectral intensity information for the local primary standard calibration light source;
  - a calibrated photodetector with a response that is traceable to a known standard; and
  - an output port adapted for outputting calibrated spectral intensity information generated by the reference spectrograph for the reference light source; and
- a second spectrograph optically coupled to the reference light source, the second spectrograph comprising:
  - an optical port for receiving light from the reference light source;
  - an input port for receiving the calibrated spectral intensity information generated by the reference spectrograph for the reference light source; and
  - computational electronics for converting raw spectral intensity information generated by the second spectrograph into calibrated intensity information based on a comparison of calibrated intensity information received from the reference spectrograph for the reference light source and raw spectral intensity information produced by the second spectrograph for the reference light source.

38. The system for calibrating recited in claim 37, further comprising:
- a local primary standard calibration light source optically coupled to the reference spectrograph, said local primary standard calibration light source having a plurality of known spectral intensities.

39. The system for calibrating recited in claim 38, wherein a bandwidth of the local primary standard calibration light source encompasses a spectral range for the reference spectrograph.

40. The system for calibrating recited in claim 37, wherein the response of the local primary standard calibration light source encompasses a spectral range for the reference spectrograph.

41. A system for calibrating a radiometric optical monitoring system used for fault detection and process monitoring, comprising:
- a plasma chamber comprising a plurality of walls which at least partially enclose a process volume, and comprising a viewport window having an exterior surface and an interior surface, said viewport window disposed along one of the walls of the process chamber;
- an optical coupling system, said optical coupling system coupled to the second spectrograph and the window on the plasma chamber;
- a reference light source;
- a reference spectrograph optically coupled to the reference light source, the reference spectrograph comprising:
  - an optical port adapted for receiving light from the reference light source;
  - computational electronics for converting raw spectral intensity information generated by the reference spectrograph into calibrated intensity information based on a comparison of known spectral intensity information for a local primary standard calibration light source to raw spectral intensity information for the local primary standard calibration light source; and
  - an output port adapted for outputting calibrated spectral intensity information generated by the reference spectrograph for the reference light source; and
- a second spectrograph optically coupled to the reference light source, the second spectrograph comprising:
  - an optical port for receiving light from the reference light source;
  - an input port for receiving the calibrated spectral intensity information generated by the reference spectrograph for the reference light source; and
  - computational electronics for converting raw spectral intensity information generated by the second spectrograph into calibrated intensity information based on a comparison of calibrated intensity information received from the reference spectrograph for the reference light source and raw spectral intensity information produced by the second spectrograph for the reference light source.

42. The system for calibrating recited in claim 41, wherein the plasma chamber further comprises:
- a light chamber disposed along one of the walls of the process chamber, said light chamber visible at the viewport window, wherein the light source is disposed within the light chamber.

43. The system for calibrating recited in claim 42, wherein the light chamber further comprises:
- a light chamber window disposed between the light chamber and the process volume of the process chamber for isolating the calibration light source from the process volume.

44. The system for calibrating recited in claim 43, wherein the light chamber further comprises:
- a shutter disposed between the light chamber window and the process volume of the process chamber for selectively covering at least a portion of the light chamber window.

45. The system for calibrating recited in claim 44, wherein the light chamber further comprises:
- an optical component for projecting a light image from the calibration light source in an interior of the plasma chamber.

46. The system for calibrating recited in claim 37, further comprises:
- an integrating sphere optical coupling system coupled between the reference spectrograph the second spectrograph; and the integrating sphere optical coupling system further coupled between the reference spectrograph and the reference light source.

47. The system for calibrating recited in claim 46, wherein the integrating sphere optical coupling system further comprises:
  a first optical port coupled to the reference light source; and
  a second optical port coupled to one of the second spectrograph and the reference spectrograph.

48. The system for calibrating recited in claim 41, wherein the process chamber comprising further comprises:
  a window chamber defined by the viewport window, a portion of one of the walls of the process chamber and a multichannel array;
  a window chamber ingress port traversing the one of the walls of the process chamber to the window chamber; and the multichannel array comprising:
  a body having an interior surface and an exterior surface for pneumatically isolating a window chamber pressure within the window chamber from the confinement pressure; and
  a predetermined quantity of channels, each of said predetermined quantity of channels having an interior end and an exterior end, a cross-sectional shape with a channel diameter and a channel length between the interior and exterior ends, at least one of said channel diameter, said channel length and said predetermined quantity of channels being related to establishing a flow rate across the predetermined quantity of channels with a pressure differential across the predetermined quantity of channels.

* * * * *